(12) United States Patent
Khoshnevisan et al.

(10) Patent No.: US 12,323,218 B2
(45) Date of Patent: Jun. 3, 2025

(54) BEAM FAILURE RECOVERY TECHNIQUES FOR MULTIPLE TRANSMISSION-RECEPTION POINTS IN A SECONDARY CELL

(71) Applicant: QUALCOMM Incorporated, San Diego, CA (US)

(72) Inventors: Mostafa Khoshnevisan, San Diego, CA (US); Tao Luo, San Diego, CA (US); Yan Zhou, San Diego, CA (US); Linhai He, San Diego, CA (US); Peter Gaal, San Diego, CA (US); Juan Montojo, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 17/328,907

(22) Filed: May 24, 2021

(65) Prior Publication Data

US 2021/0376909 A1    Dec. 2, 2021

Related U.S. Application Data

(60) Provisional application No. 63/029,916, filed on May 26, 2020.

(51) Int. Cl.
*H04B 7/08*   (2006.01)
*H04W 72/02*  (2009.01)
(Continued)

(52) U.S. Cl.
CPC ............ *H04B 7/088* (2013.01); *H04W 72/02* (2013.01); *H04W 72/046* (2013.01); *H04W 76/19* (2018.02); *H04W 36/0069* (2018.08)

(58) Field of Classification Search
CPC .... H04B 7/088; H04B 7/0408; H04B 7/0695; H04B 7/022; H04W 72/02; H04W 72/046;
(Continued)

(56) References Cited

U.S. PATENT DOCUMENTS

| 11,184,080 B2    | 11/2021 | Nagaraja et al. |
| 2019/0356371 A1  | 11/2019 | Osawa et al.    |

(Continued)

FOREIGN PATENT DOCUMENTS

| CN | 110637496 A | 12/2019 |
| CN | 111066344 A | 4/2020  |

(Continued)

OTHER PUBLICATIONS

International Search Report and Written Opinion—PCT/US2021/034006—ISA/EPO—Sep. 6, 2021.
(Continued)

*Primary Examiner* — Jamaal Henson
(74) *Attorney, Agent, or Firm* — Holland & Hart LLP

(57) ABSTRACT

Methods, systems, and devices for wireless communications are described in which one of multiple transmission-reception points (TRPs) may be identified for beam failure procedures in a secondary cell (Scell). Reference signals of the different TRPs may have a different control resource set pool index values, and a user equipment (UE) may monitor such reference signals as part of a beam failure detection (BFD) procedure. The UE may identify one or more beams associated with a particular pool index value that has a degraded channel quality, and may determine to declare a beam failure. The UE may transmit a link recovery request to a serving cell that requests uplink resources for a beam failure recovery message. The UE may receive an uplink
(Continued)

grant and may transmit a beam failure recovery message that indicates the Scell and TRP with the beam failure.

13 Claims, 22 Drawing Sheets

(51) Int. Cl.
*H04W 72/044* (2023.01)
*H04W 76/19* (2018.01)
*H04W 36/00* (2009.01)

(58) Field of Classification Search
CPC ... H04W 76/19; H04W 16/28; H04W 36/305; H04W 36/0069
See application file for complete search history.

(56) References Cited

U.S. PATENT DOCUMENTS

| | | | |
|---|---|---|---|
| 2020/0059398 A1 | 2/2020 | Pan et al. | |
| 2020/0350972 A1* | 11/2020 | Yi | H04L 1/12 |
| 2021/0045070 A1* | 2/2021 | Yi | H04W 76/27 |
| 2021/0105176 A1 | 4/2021 | Tsai et al. | |
| 2021/0105827 A1* | 4/2021 | Tsai | H04W 76/28 |
| 2021/0282168 A1* | 9/2021 | Matsumura | H04L 5/0048 |
| 2021/0297959 A1* | 9/2021 | Zhou | H04W 72/1263 |
| 2021/0321379 A1* | 10/2021 | Cirik | H04W 72/044 |
| 2021/0378004 A1* | 12/2021 | Cirik | H04W 72/0446 |
| 2022/0103225 A1* | 3/2022 | Ling | H04B 7/0695 |
| 2022/0150926 A1* | 5/2022 | Mondal | H04W 72/044 |
| 2022/0295589 A1* | 9/2022 | Tsai | H04B 17/309 |
| 2022/0337363 A1* | 10/2022 | Guo | H04L 5/0048 |

FOREIGN PATENT DOCUMENTS

| | | | |
|---|---|---|---|
| EP | 3823176 A1 | 5/2021 | |
| WO | WO-2019051362 A1 | 3/2019 | |
| WO | WO-2020012619 A1 | 1/2020 | |
| WO | WO-2020048443 A1 | 3/2020 | |
| WO | WO-2021088032 A1 * | 5/2021 | |

OTHER PUBLICATIONS

Mediatek Inc: "Enhancements on Multi-Beam Operations", 3GPP Draft, 3GPP TSG RAN WG1 #99, R1-1912135, 3rd Generation Partnership Project (3GPP), Mobile Competence Centre, 650, Route Des Lucioles, F-06921, Sophia-Antipolis, Cedex, France, vol. RAN WG1, No. Reno, USA, Nov. 18, 2019-Nov. 22, 2019, Nov. 9, 2019 (Nov. 9, 2019), XP051823216, 10 pages, Retrieved from the Internet: URL:https://ftp.3gpp.org/tsg_ran/WG1_RL1/TSGR1_99/Docs/R1-1912135.zip, R1-1912135 Multi-Beam Operation.docx [retrieved on Nov. 9, 2019] section 4, p. 6-p. 7, figure 2.

* cited by examiner

//BEAM FAILURE RECOVERY TECHNIQUES FOR MULTIPLE TRANSMISSION-RECEPTION POINTS IN A SECONDARY CELL

CROSS REFERENCE

The present application for patent claims the benefit of U.S. Provisional Patent Application No. 63/029,916 by KHOSHNEVISAN et al., entitled "BEAM FAILURE RECOVERY TECHNIQUES FOR MULTIPLE TRANSMISSION RECEPTION POINTS IN A SECONDARY CELL," filed May 26, 2020, assigned to the assignee hereof, and expressly incorporated by reference herein.

FIELD OF TECHNOLOGY

The following relates generally to wireless communications and more specifically to beam failure recovery techniques for multiple transmission-reception points in a secondary cell.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and a base station may communicate over a communication link using a directional beam. Changes in the radio environment between the UE and the base station may degrade the quality of the beam used by the UE and the base station, which may result in communication failures between the UE and the base station. The UE may attempt to perform a beam failure recovery (BFR) procedure to re-establish connection with the base station. Additionally, in some wireless communications systems a UE may be in communication with more than one transmission-reception point (TRP) (e.g., in a multi-TRP configuration). Each of the more than one TRP may transmit downlink transmissions to the UE according to a beam configuration and the UE may decode the downlink transmissions from each of the more than one TRPs according to the beam configurations. Efficient BFR procedures in multi-TRP configurations may help enhance multi-TRP communications.

SUMMARY

The described techniques relate to improved methods, systems, devices, and apparatuses that support beam failure recovery techniques for multiple transmission-reception points in a secondary cell. Various aspects provide that a user equipment (UE) may establish a connection with a primary cell (Pcell) and a secondary cell (Scell), where the Scell connection uses beamformed communications via two or more transmission-reception points (TRPs). In some cases, the different TRPs may be associated with different control resource set (CORESET) pool index values, and one or more component carriers (CCs) may be configured with multiple CORESET pool index values. In some cases, the UE may perform beam failure detection (BFD) procedures that may identify one or more beams associated with a particular CORESET pool index value that have a degraded channel quality.

In some cases, different reference signals transmitted via each of the TRPs (e.g., for BFD or for candidate beam detection (CBD)) may provide an indication of a corresponding CORESET pool index (e.g., based on a reference signal sequence that is mapped to the CORESET pool index), which may be detected at the UE. In some cases, the UE may determine to declare a beam failure for one or more beams, and may transmit a link recovery request (LRR) to a base station that requests uplink resources for a beam failure recovery (BFR) message. In some cases, the LRR may be transmitted using an uplink resource associated with one of the TRPs that may be selected based on the BFD. In some cases, the UE may receive an uplink grant responsive to the LRR, and may transmit a beam failure recovery message that indicates one or more CCs and an associated CORESET pool index, and that may also indicate one or more candidate beams for subsequent communications. In some cases, subsequent communications using the identified candidate beam(s) may be initiated by resetting one or more beams of the Scell to the identified candidate beam(s).

A method of wireless communication at a UE is described. The method may include establishing a connection using a first set of one or more beams and a second set of one or more beams, where each of the first set of one or more beams and the second set of one or more beams are associated with a serving cell of the UE, determining to declare a beam failure for the first set of the one or more beams based on a channel metric associated with the first set of one or more beams dropping below a threshold criteria, selecting, responsive to the determining to declare the beam failure, one or more of a first uplink control resource or a second uplink control resource associated with a recovery request message, and transmitting the recovery request message via the selected uplink control resource.

An apparatus for wireless communication at a UE is described. The apparatus may include a processor, memory coupled with the processor, and instructions stored in the memory. The instructions may be executable by the processor to cause the apparatus to establish a connection using a first set of one or more beams and a second set of one or more beams, where each of the first set of one or more beams and the second set of one or more beams are associated with a serving cell of the UE, determine to declare a beam failure for the first set of one or more beams based on a channel metric associated with the first set of one or more beams dropping below a threshold criteria, select, responsive to the determining to declare the beam failure, one or more of a first uplink control resource or a second uplink control resource associated with a recovery request message, and transmit the recovery request message via the selected uplink control resource.

Another apparatus for wireless communication at a UE is described. The apparatus may include means for establishing a connection using a first set of one or more beams and a second set of one or more beams, where each of the first set of one or more beams and the second set of one or more beams are associated with a serving cell of the UE, determining to declare a beam failure for the first set of one or more beams based on a channel metric associated with the first set of one or more beams dropping below a threshold criteria, selecting, responsive to the determining to declare the beam failure, one or more of a first uplink control resource or a second uplink control resource associated with a recovery request message, and transmitting the recovery request message via the selected uplink control resource.

A non-transitory computer-readable medium storing code for wireless communication at a UE is described. The code may include instructions executable by a processor to establish a connection using a first set of one or more beams and a second set of one or more beams, where each of the first set of one or more beams and the second set of one or more beams are associated with a serving cell of the UE, determine to declare a beam failure for the first set of one or more beams based on a channel metric associated with the first set of one or more beams dropping below a threshold criteria, select, responsive to the determining to declare the beam failure, one or more of a first uplink control resource or a second uplink control resource associated with a recovery request message, and transmit the recovery request message via the selected uplink control resource.

Some examples of the method, apparatuses, and non-transitory computer-readable medium described herein may further include operations, features, means, or instructions for measuring a first set of one or more reference signals corresponding to the first set of one or more beams and a second set of one or more reference signals corresponding to the second set of one or more beams, where the first set of one or more reference signals and the first set of one or more beams is associated with a first control resource set pool index value, and the second set of one or more reference signals and the second set of one or more beams is associated with a second control resource set pool index value, and where the determining to declare the beam failure is based on the channel metric associated with the first set of one or more reference signals being below the threshold criteria, identifying a candidate beam that has an associated channel metric that meets the threshold criteria or one or more other criteria, and determining a control resource set pool index value of the identified candidate beam, where the selected uplink control resource is determined based on the identified candidate beam.

Some examples of the method, apparatuses, and non-transitory computer-readable medium described herein may further include operations, features, means, or instructions for transmitting an indication that declares the beam failure for the first set of one or more beams of the serving cell, where the candidate beam is identified from within a set of candidate beams associated with the first control resource set pool index value for which the beam failure is declared.

In some examples of the method, apparatuses, and non-transitory computer-readable medium described herein the first control resource set pool index value is associated with a first TRP of the serving cell and the second control resource set pool index value is associated with a second TRP of the serving cell.

Some examples of the method, apparatuses, and non-transitory computer-readable medium described herein may further include operations, features, means, or instructions for receiving configuration information that indicates a first set of reference signals associated with a first control resource set pool index value and a second set of reference signals associated with a second control resource set pool index value, measuring the first set of one or more reference signals and the second set of one or more reference signals, identifying a candidate beam based on the measuring, and determining which of the first control resource set pool index value or the second control resource set pool index value is associated with the identified candidate beam based on the configuration information.

Some examples of the method, apparatuses, and non-transitory computer-readable medium described herein may further include operations, features, means, or instructions for receiving, responsive to the recovery request message, an uplink grant for an uplink communication, and transmitting, responsive to the receiving the uplink grant, the uplink communication that indicates at least the identified candidate beam and an associated control resource set pool index value of the serving cell. Some examples of the method, apparatuses, and non-transitory computer-readable medium described herein may further include operations, features, means, or instructions for communicating with one or more of a first TRP of the serving cell or a second TRP of the serving cell using the identified candidate beam subsequent to transmission of the uplink communication.

In some examples of the method, apparatuses, and non-transitory computer-readable medium described herein, the first uplink control resource is associated with a first scheduling request identification and the second uplink control resource is associated with a second scheduling request identification. In some examples of the method, apparatuses, and non-transitory computer-readable medium described herein, the first uplink control resource is associated with a first control resource set pool index value and the second uplink control resource is associated with a second control resource set pool index value.

In some examples of the method, apparatuses, and non-transitory computer-readable medium described herein, the selecting further may include operations, features, means, or instructions for selecting the second uplink control resource associated with the second control resource set pool index value of the serving cell for transmission of the recovery request message. In some examples of the method, apparatuses, and non-transitory computer-readable medium described herein, the second uplink control resource is selected based on a component carrier used to transmit the recovery request message being in a same frequency band as the serving cell.

In some examples of the method, apparatuses, and non-transitory computer-readable medium described herein, the selecting further may include operations, features, means, or instructions for selecting the first uplink control resource associated with the first control resource set pool index value of the serving cell for transmission of the recovery request message. In some examples of the method, apparatuses, and non-transitory computer-readable medium described herein, the first uplink control resource is selected based on a feedback configuration that indicates separate feedback is to be provided using the first control resource set pool index value of the serving cell and a second control resource set pool index value of the serving cell.

In some examples of the method, apparatuses, and non-transitory computer-readable medium described herein, the selecting further may include operations, features, means, or instructions for selecting the first uplink control resource or the second uplink control resource based on which of the first uplink control resource or the second uplink control resource is associated with a lowest control resource set pool index value.

In some examples of the method, apparatuses, and non-transitory computer-readable medium described herein, the lowest control resource set pool index value is used for selection of the first uplink control resource or the second uplink control resource when a component carrier used to transmit the recovery request message is in a different frequency band than a frequency band of the serving cell.

In some examples of the method, apparatuses, and non-transitory computer-readable medium described herein different instances of the recovery request message are transmitted via each of the first uplink control resource and the second uplink control resource.

In some examples of the method, apparatuses, and non-transitory computer-readable medium described herein each of the first set of one or more beams are associated with a first TRP of the serving cell and the second set of one or more beams are associated with a second TRP of the serving cell of the UE.

A method of wireless communication at a UE is described. The method may include establishing a connection with at least a first transmission-reception point using a first set of one or more beams and a second transmission-reception point using a second set of one or more beams, where each of the first transmission-reception point and the second transmission-reception point are associated with a secondary cell used for communications at the UE, determining to declare a beam failure for the first transmission-reception point based on a channel metric associated with the first set of one or more beams dropping below a threshold criteria, identifying a candidate beam associated with one of the first transmission-reception point or the second transmission-reception point that has an associated channel metric that meets the threshold criteria, and transmitting a beam failure recovery message to one of the first transmission-reception point or the second transmission-reception point that indicates the candidate beam and which of the first transmission-reception point or the second transmission-reception point is associated with the candidate beam.

An apparatus for wireless communication at a UE is described. The apparatus may include a processor, memory coupled with the processor, and instructions stored in the memory. The instructions may be executable by the processor to cause the apparatus to establish a connection with at least a first transmission-reception point using a first set of one or more beams and a second transmission-reception point using a second set of one or more beams, where each of the first transmission-reception point and the second transmission-reception point are associated with a secondary cell used for communications at the UE, determine to declare a beam failure for the first transmission-reception point based on a channel metric associated with the first set of one or more beams dropping below a threshold criteria, identify a candidate beam associated with one of the first transmission-reception point or the second transmission-reception point that has an associated channel metric that meets the threshold criteria, and transmit a beam failure recovery message to one of the first transmission-reception point or the second transmission-reception point that indicates the candidate beam and which of the first transmission-reception point or the second transmission-reception point is associated with the candidate beam.

Another apparatus for wireless communication at a UE is described. The apparatus may include means for establishing a connection with at least a first transmission-reception point using a first set of one or more beams and a second transmission-reception point using a second set of one or more beams, where each of the first transmission-reception point and the second transmission-reception point are associated with a secondary cell used for communications at the UE, determining to declare a beam failure for the first transmission-reception point based on a channel metric associated with the first set of one or more beams dropping below a threshold criteria, identifying a candidate beam associated with one of the first transmission-reception point or the second transmission-reception point that has an associated channel metric that meets the threshold criteria, and transmitting a beam failure recovery message to one of the first transmission-reception point or the second transmission-reception point that indicates the candidate beam and which of the first transmission-reception point or the second transmission-reception point is associated with the candidate beam.

A non-transitory computer-readable medium storing code for wireless communication at a UE is described. The code may include instructions executable by a processor to establish a connection with at least a first transmission-reception point using a first set of one or more beams and a second transmission-reception point using a second set of one or more beams, where each of the first transmission-reception point and the second transmission-reception point are associated with a secondary cell used for communications at the UE, determine to declare a beam failure for the first transmission-reception point based on a channel metric associated with the first set of one or more beams dropping below a threshold criteria, identify a candidate beam associated with one of the first transmission-reception point or the second transmission-reception point that has an associated channel metric that meets the threshold criteria, and transmit a beam failure recovery message to one of the first transmission-reception point or the second transmission-reception point that indicates the candidate beam and which of the first transmission-reception point or the second transmission-reception point is associated with the candidate beam.

Some examples of the method, apparatuses, and non-transitory computer-readable medium described herein may further include operations, features, means, or instructions for measuring a first set of one or more reference signals corresponding to the first set of one or more beams and a second set of one or more reference signals corresponding to the second set of one or more beams, where the first set of one or more reference signals and the first set of one or more beams are associated with a first control resource set pool index value, and the second set of one or more reference signals and the second set of one or more beams are associated with a second control resource set pool index value, and where the determining to declare the beam failure is based on the channel metric associated with the first set of one or more reference signals being below the threshold criteria.

Some examples of the method, apparatuses, and non-transitory computer-readable medium described herein may further include operations, features, means, or instructions for transmitting, responsive to the determining to declare the beam failure, a recovery request message to one or more of the first transmission-reception point via a first uplink control resource or the second transmission-reception point via a second uplink control resource.

Some examples of the method, apparatuses, and non-transitory computer-readable medium described herein may further include operations, features, means, or instructions for communicating with one or more of the first transmission-reception point or the second transmission-reception point using the identified candidate beam subsequent to transmission of the beam failure recovery message.

In some examples of the method, apparatuses, and non-transitory computer-readable medium described herein, the communicating may include operations, features, means, or instructions for resetting the beams for one or more control resource sets with a same value as a control resource set pool index value of the identified candidate beam.

In some examples of the method, apparatuses, and non-transitory computer-readable medium described herein, a transmission beam for transmitting uplink control information, when the secondary cell is configured for uplink control information transmissions, corresponds to the identified candidate beam, or corresponds to a different beam having a different control resource set pool index value than the identified candidate beam.

In some examples of the method, apparatuses, and non-transitory computer-readable medium described herein, the beam failure recovery message is a medium access control (MAC) control element and includes a reference signal identification of the candidate beam, and where the reference signal identification indicates the transmission-reception point associated with the candidate beam.

In some examples of the method, apparatuses, and non-transitory computer-readable medium described herein, a set of reference signal identifications is configured at the UE prior to the determining in a reference signal identification list.

In some examples of the method, apparatuses, and non-transitory computer-readable medium described herein, the beam failure recovery message includes a first set of bits that indicates which of the first transmission-reception point or the second transmission-reception point is associated with the identified candidate beam and a second set of bits that indicates the identified candidate beam. In some examples of the method, apparatuses, and non-transitory computer-readable medium described herein, the first set of bits and the second set of bits are provided for each of one or more component carriers for which the beam failure is declared.

In some examples of the method, apparatuses, and non-transitory computer-readable medium described herein, the beam failure recovery message includes a first set of bits that indicates which of the first transmission-reception point or the second transmission-reception point is associated with the identified candidate beam, a second set of bits that indicates one or more component carriers for which the beam failure is declared, and a third set of bits that indicates that indicates the identified candidate beam.

In some examples of the method, apparatuses, and non-transitory computer-readable medium described herein, the beam failure recovery message includes a first set of bits that indicate which of a set of component carriers for which the beam failure is declared, and a second set of bits that indicates the identified candidate beam associated with each indicated component carrier, and where the transmission-reception point associated with the identified candidate beam is indicated based on an ordering of the first set of bits.

In some examples of the method, apparatuses, and non-transitory computer-readable medium described herein, the set of component carriers are ordered in the first set of bits according to a component carrier index value or a control resource set pool index value of the associated component carrier. In some examples of the method, apparatuses, and non-transitory computer-readable medium described herein, the first set of bits includes a number of bits that are based on a number of component carriers that are configured for communications with multiple transmission-reception points. In some examples of the method, apparatuses, and non-transitory computer-readable medium described herein, a format of the beam recovery message is selected from two or more available formats based on a number of component carriers that are configured for communications with multiple transmission-reception points.

A method of wireless communication at a base station is described. The method may include establishing communications with a UE via a serving cell, where communications via the serving cell use at least a first set of one or more beams of the serving cell and a second set of one or more beams of the serving cell, configuring a first uplink control resource and a second uplink control resource for transmission of a recovery request message that indicates a beam failure of the serving cell at the UE, receiving the recovery request message from the UE in the first uplink control resource, and determining, based on the recovery request message, that the UE has declared the beam failure.

An apparatus for wireless communication at a base station is described. The apparatus may include a processor, memory coupled with the processor, and instructions stored in the memory. The instructions may be executable by the processor to cause the apparatus to establish communications with a UE via a serving cell, where communications via the serving cell use at least a first set of one or more beams of the serving cell and a second set of one or more beams of the serving cell, configure a first uplink control resource and a second uplink control resource for transmission of a recovery request message that indicates a beam failure of the serving cell at the UE, receive the recovery request message from the UE in the first uplink control resource, and determine, based on the recovery request message, that the UE has declared the beam failure.

Another apparatus for wireless communication at a base station is described. The apparatus may include means for establishing communications with a UE via a serving cell, where communications via the serving cell use at least a first set of one or more beams of the serving cell and a second set of one or more beams of the serving cell, configuring a first uplink control resource and a second uplink control resource for transmission of a recovery request message that indicates a beam failure of the serving cell at the UE, receiving the recovery request message from the UE in the first uplink control resource, and determining, based on the recovery request message, that the UE has declared the beam failure.

A non-transitory computer-readable medium storing code for wireless communication at a base station is described. The code may include instructions executable by a processor to establish communications with a UE via a serving cell, where communications via the serving cell use at least a first set of one or more beams of the serving cell and a second set of one or more beams of the serving cell, configure a first uplink control resource and a second uplink control resource for transmission of a recovery request message that indicates a beam failure of the serving cell at the UE, receive the recovery request message from the UE in the first uplink control resource, and determine, based on the recovery request message, that the UE has declared the beam failure.

Some examples of the method, apparatuses, and non-transitory computer-readable medium described herein may further include operations, features, means, or instructions for configuring two or more control resource set pools with reference signal identifications associated with a first TRP of the serving cell or a second TRP of the serving cell, and where the beam failure is based on a channel metric associated with a first reference signal being below the threshold criteria, and where the first uplink control resource is determined based on the control resource set pool index value of a candidate beam that is indicated in the recovery request message.

Some examples of the method, apparatuses, and non-transitory computer-readable medium described herein may further include operations, features, means, or instructions for transmitting, responsive to the recovery request message, an uplink grant to the UE for an uplink communication, and receiving, responsive to the uplink grant, the uplink communication that indicates the candidate beam, and an associated control resource set pool index value of the serving cell.

Some examples of the method, apparatuses, and non-transitory computer-readable medium described herein may further include operations, features, means, or instructions for communicating with the UE using the identified candidate beam subsequent to the reception of the uplink control channel communication. In some examples of the method, apparatuses, and non-transitory computer-readable medium described herein, the first uplink control resource is associated with a first scheduling request identification and the second uplink control resource is associated with a second scheduling request identification, and where the recovery request message indicates the first scheduling request identification or the second scheduling request identification. In some examples of the method, apparatuses, and non-transitory computer-readable medium described herein, the first uplink control resource is associated with a first control resource set pool index value of a first beam of the first set of one or more beams and the second uplink control resource is associated with a second control resource set pool index value of a second beam of the second set of one or more beams.

In some examples of the method, apparatuses, and non-transitory computer-readable medium described herein, the second uplink control resource associated with a second TRP of the serving cell that is used for transmission of the recovery request message. In some examples of the method, apparatuses, and non-transitory computer-readable medium described herein, the second uplink control resource is selected based on a component carrier used to transmit the recovery request message being in a same frequency band as a first beam of the first set of one or more beams and a second beam of the second set of one or more beams.

In some examples of the method, apparatuses, and non-transitory computer-readable medium described herein, the first uplink control resource associated with a first TRP of the serving cell is selected for transmission of the recovery request message. In some examples of the method, apparatuses, and non-transitory computer-readable medium described herein, the first uplink control resource is selected based on a feedback configuration that indicates separate feedback is to be provided using the first control resource set pool index value of the serving cell and a second control resource set pool index value of the serving cell.

In some examples of the method, apparatuses, and non-transitory computer-readable medium described herein, the first uplink control resource or the second uplink control resource is selected based on which of the first uplink control resource or the second uplink control resource is associated with a lowest control resource set pool index value.

In some examples of the method, apparatuses, and non-transitory computer-readable medium described herein, the lowest control resource set pool index value is used for selection of the first uplink control resource or the second uplink control resource when a component carrier used to transmit the recovery request message is in a different frequency band than a first beam of the first set of one or more beams and a second beam of the second set of one or more beams.

In some examples of the method, apparatuses, and non-transitory computer-readable medium described herein, different instances of the recovery request message are received via each of the first uplink control resource and the second uplink control resource.

A method of wireless communication at a base station is described. The method may include establishing communications with a UE via a primary cell and a secondary cell, where communications via the secondary cell use at least a first transmission-reception point using a first beam and a second transmission-reception point using a second beam, configuring a beam failure recovery message for transmission by the UE that indicates a beam failure of the secondary cell at the UE, receiving the beam failure recovery message from the UE that indicates a candidate beam and which of the first transmission-reception point or the second transmission-reception point is associated with the candidate beam, and communicating with the UE via the candidate beam responsive to the beam failure recovery message.

An apparatus for wireless communication at a base station is described. The apparatus may include a processor, memory coupled with the processor, and instructions stored in the memory. The instructions may be executable by the processor to cause the apparatus to establish communications with a UE via a primary cell and a secondary cell, where communications via the secondary cell use at least a first transmission-reception point using a first beam and a second transmission-reception point using a second beam, configure a beam failure recovery message for transmission by the UE that indicates a beam failure of the secondary cell at the UE, receive the beam failure recovery message from the UE that indicates a candidate beam and which of the first transmission-reception point or the second transmission-reception point is associated with the candidate beam, and communicate with the UE via the candidate beam responsive to the beam failure recovery message.

Another apparatus for wireless communication at a base station is described. The apparatus may include means for establishing communications with a UE via a primary cell and a secondary cell, where communications via the secondary cell use at least a first transmission-reception point using a first beam and a second transmission-reception point using a second beam, configuring a beam failure recovery message for transmission by the UE that indicates a beam failure of the secondary cell at the UE, receiving the beam failure recovery message from the UE that indicates a candidate beam and which of the first transmission-reception point or the second transmission-reception point is associated with the candidate beam, and communicating with the UE via the candidate beam responsive to the beam failure recovery message.

A non-transitory computer-readable medium storing code for wireless communication at a base station is described. The code may include instructions executable by a processor to establish communications with a UE via a primary cell and a secondary cell, where communications via the secondary cell use at least a first transmission-reception point using a first beam and a second transmission-reception point using a second beam, configure a beam failure recovery message for transmission by the UE that indicates a beam failure of the secondary cell at the UE, receive the beam failure recovery message from the UE that indicates a candidate beam and which of the first transmission-reception point or the second transmission-reception point is associated with the candidate beam, and communicate with the UE via the candidate beam responsive to the beam failure recovery message.

Some examples of the method, apparatuses, and non-transitory computer-readable medium described herein may further include operations, features, means, or instructions for configuring a first set of failure detection resources corresponding to a first control resource set pool index for the first transmission-reception point and a second set of failure detection resources corresponding to a second control resource set pool index for the second transmission-reception point, and where the beam failure recovery message is communicated using the set of failure detection resources that corresponds to one of the first transmission-reception point or the second transmission-reception point.

Some examples of the method, apparatuses, and non-transitory computer-readable medium described herein may further include operations, features, means, or instructions for receiving, prior to the receiving the beam failure recovery message, a recovery request message, and transmitting an uplink grant to the UE for the beam failure recovery message. In some examples of the method, apparatuses, and non-transitory computer-readable medium described herein, the communicating with the UE via the candidate beam is initiated at a predetermined time subsequent to the beam failure recovery message.

In some examples of the method, apparatuses, and non-transitory computer-readable medium described herein, the beam failure recovery message is a medium access control (MAC) control element and includes a reference signal identification of the candidate beam, and where the reference signal identification indicates the transmission-reception point associated with the candidate beam.

In some examples of the method, apparatuses, and non-transitory computer-readable medium described herein, a set of reference signal identifications are configured at the UE in a reference signal identification list.

In some examples of the method, apparatuses, and non-transitory computer-readable medium described herein, the beam failure recovery message includes a first set of bits that indicates which of the first transmission-reception point or the second transmission-reception point is associated with the identified candidate beam and a second set of bits that indicates the identified candidate beam. In some examples of the method, apparatuses, and non-transitory computer-readable medium described herein, the first set of bits and the second set of bits are provided for each of one or more component carriers for which the beam failure is declared.

In some examples of the method, apparatuses, and non-transitory computer-readable medium described herein, the beam failure recovery message includes a first set of bits that indicates which of the first transmission-reception point or the second transmission-reception point is associated with the identified candidate beam, a second set of bits that indicates one or more component carriers for which the beam failure is declared, and a third set of bits that indicates that indicates the identified candidate beam.

In some examples of the method, apparatuses, and non-transitory computer-readable medium described herein, the beam failure recovery message includes a first set of bits that indicate which of a set of component carriers for which the beam failure is declared, and a second set of bits that indicates the identified candidate beam associated with each indicated component carrier, and where the transmission-reception point associated with the identified candidate beam is indicated based on an ordering of the first set of bits.

In some examples of the method, apparatuses, and non-transitory computer-readable medium described herein, the set of component carriers are ordered in the first set of bits according to a component carrier index and a control resource set pool index value of the associated component carrier. In some examples of the method, apparatuses, and non-transitory computer-readable medium described herein, the first set of bits includes a number of bits that are based on a number of component carriers that is configured for communications with multiple transmission-reception points. In some examples of the method, apparatuses, and non-transitory computer-readable medium described herein, a format of the beam recovery message is selected from two or more available formats based on a number of component carriers that are configured for communications with multiple transmission-reception points.

DETAILED DESCRIPTION

Figure 1:
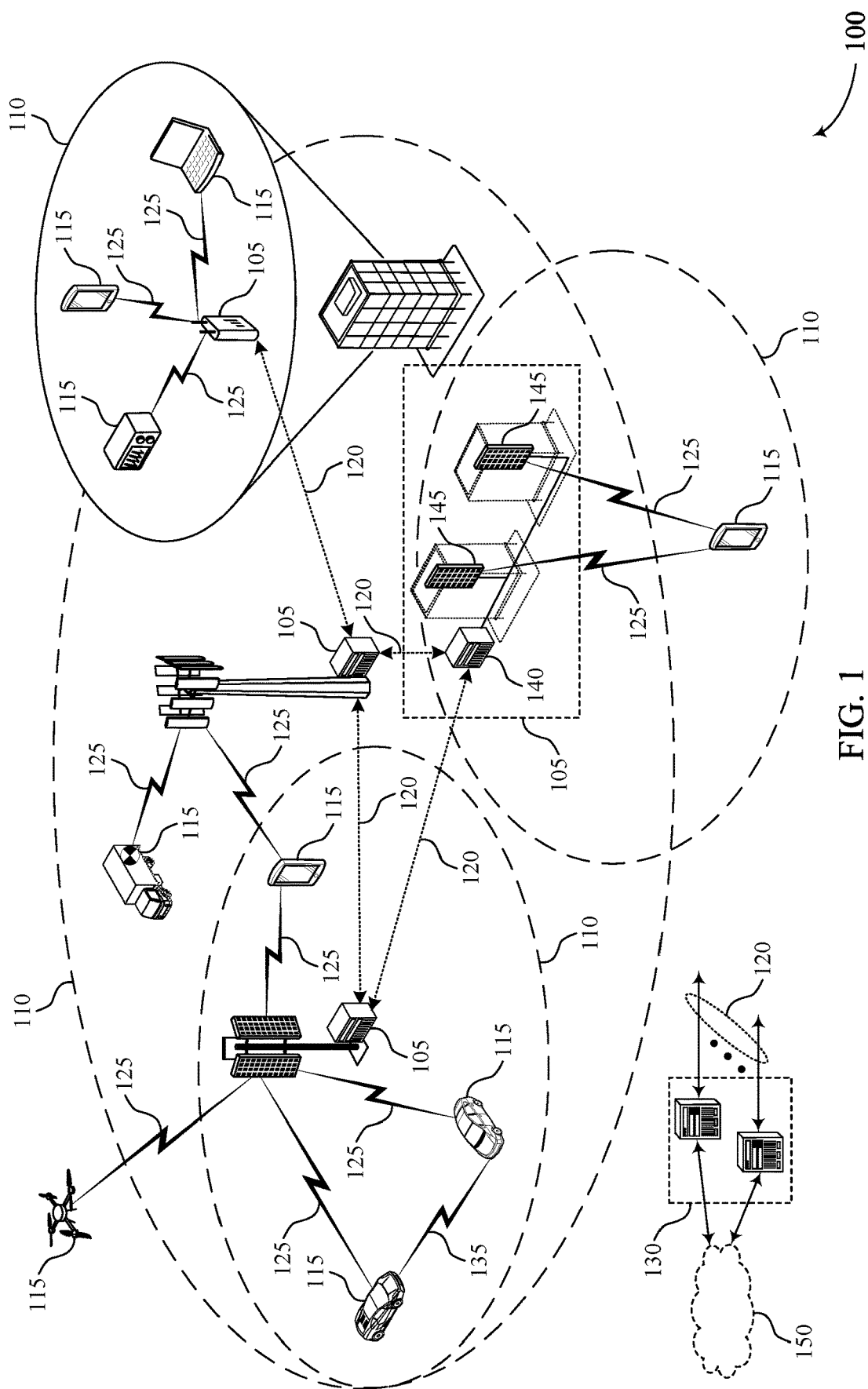
FIG. 1 illustrates an example of a system for wireless communications that supports beam failure recovery techniques for multiple transmission-reception points in a secondary cell in accordance with aspects of the present disclosure.

In some wireless communications systems, a user equipment (UE) may support communications with multiple transmission-reception points (TRPs). For example, the UE may receive downlink transmissions (e.g., via a physical downlink shared channel (PDSCH)) from multiple TRPs. Additionally, the UE may decode each of the downlink transmissions according to a beam configuration associated with the downlink transmission. Further, such multi-TRP communications may be primary cell (Pcell) communications, secondary cell (Scell) communications, or both. In some cases, one or more beams from a particular TRP may degrade to a point where effective communication via the beam is unlikely. Thus, beam failure detection (BFD) and beam failure recovery (BFR) in such cases may be beneficial to help communications. In cases where multiple TRPs are used for communications, techniques such as discussed herein may be used to identify beam failure, select candidate beams for use in subsequent communications, and communicate information related to such beams for Scells.

In some cases, a UE may establish a connection with a Pcell and a Scell, where the Scell, and in some cases the Pcell, uses beamformed communications via two or more transmission-reception points (TRPs). In some cases, the different TRPs may be associated with different control resource set (CORESET) pool index values, and one or more Scell component carriers (CCs) may be configured with multiple CORESET pool index values. Thus, from the perspective of the UE, different TRPs are transparent, and the UE can identify only different CORESET pool index values associated with received signals.

In some cases, the UE may perform BFD procedures that may identify one or more beams associated with a particular CORESET pool index value that have a degraded channel quality. In some cases, reference signals transmitted via each of the TRPs (e.g., for BFD or for candidate beam detection (CBD)) may provide an indication of a corresponding CORESET pool index (e.g., based on a reference signal sequence), which may be detected at the UE. In some cases, the UE may determine to declare a beam failure for one or more beams, and may transmit a link recovery request (LRR) to a base station that requests uplink resources for a beam failure recovery (BFR) message. In some cases, the LRR may be transmitted using an uplink resource associated with one of the TRPs that may be selected based on the BFD. In some cases, the UE may receive an uplink grant responsive to the LRR, and may transmit a beam failure recovery message that indicates one or more CCs and an associated CORESET pool index, and that may also indicate one or more candidate beams for subsequent communications. In some cases, subsequent communications using the identified candidate beam(s) may be initiated by resetting one or more beams of the Scell to the identified candidate beam(s).

Aspects of the disclosure are initially described in the context of wireless communications systems. Aspects of the disclosure are further illustrated by and described with reference to process flows, apparatus diagrams, system diagrams, and flowcharts that relate to beam failure recovery techniques for multiple transmission-reception points in a secondary cell.

FIG. 1 illustrates an example of a wireless communications system 100 that supports beam failure recovery techniques for multiple transmission-reception points in a secondary cell in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to interchangeably as radio heads (e.g., remote radio heads (RRHs)), smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As discussed herein, in some cases multiple TRPs (e.g., multiple RRHs of a base station 105) may be used to communicate with a UE 115 on a Pcell, on an Scell, or both. In some cases, reference signals of the different TRPs may have a different CORESET pool index, and one or more UEs 115 may monitor such reference signals as part of a BFD procedure. In such cases, one or more UEs 115 may identify one or more beams associated with a particular CORESET pool index value that have a degraded channel quality. In some cases, such UEs 115 may determine to declare a beam failure for one or more beams at an Scell, and may transmit a LRR to the serving base station 105 (e.g., via a Pcell) that requests uplink resources for a BFR message. In some cases, the LRR may be transmitted using an uplink resource associated with one of the TRPs that may be selected based on the BFD. In some cases, the UE 115 may receive an uplink grant responsive to the LRR, and may transmit a beam failure recovery message (e.g., a BFR MAC-CE) that indicates one or more CCs and an associated CORESET pool index, and that may also indicate one or more candidate beams for subsequent communications. In some cases, subsequent communications using the identified candidate beam(s) may be initiated by resetting one or more beams of the Scell to the identified candidate beam(s).

Figure 2:
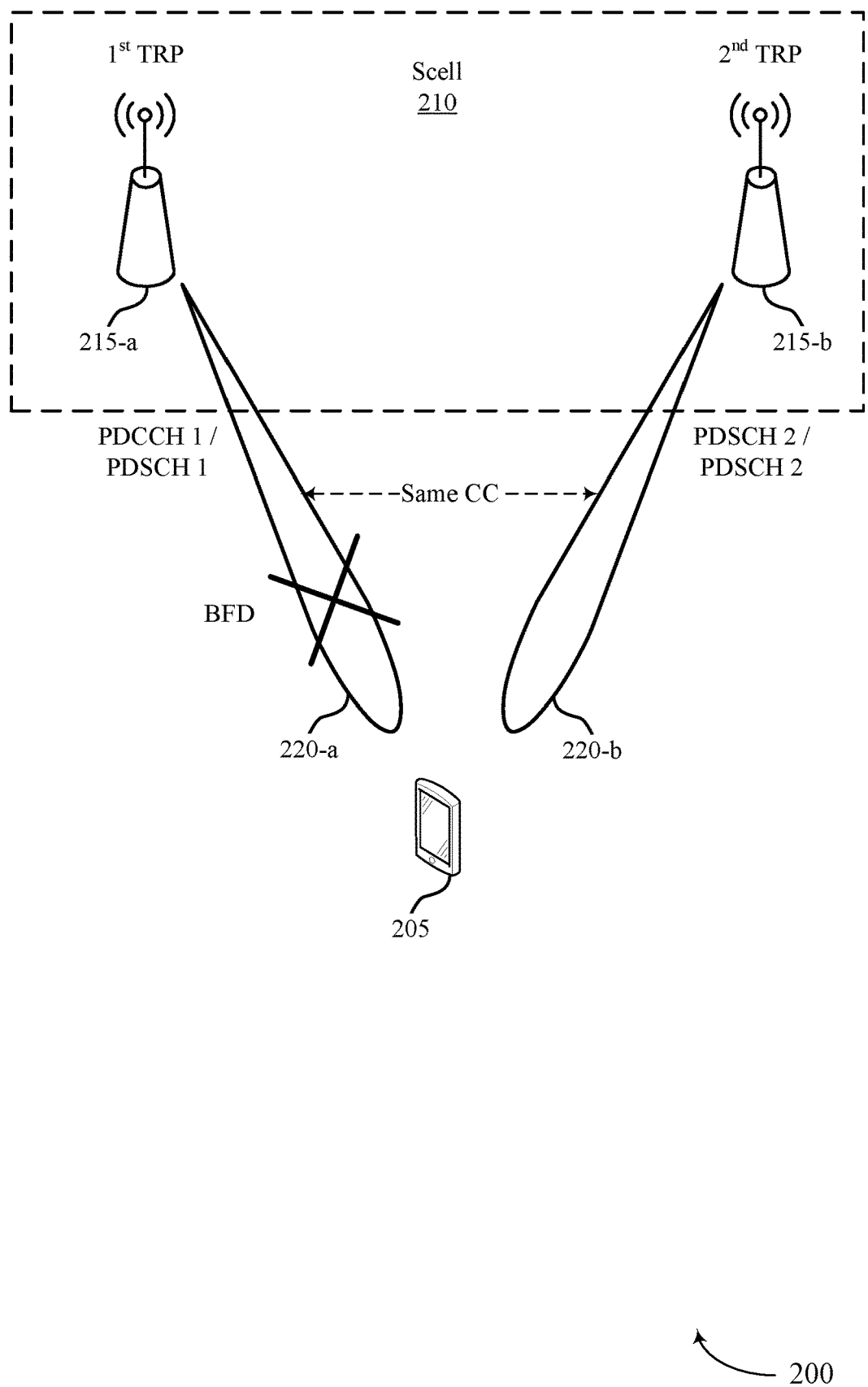
FIG. 2 illustrates an example of a portion of a wireless communications system that supports beam failure recovery techniques for multiple transmission-reception points in a secondary cell in accordance with aspects of the present disclosure.

FIG. 2 illustrates an example of a wireless communications system 200 that supports beam failure recovery techniques for multiple transmission-reception points in a secondary cell in accordance with aspects of the present disclosure. In some examples, wireless communications system 200 may implement aspects of wireless communications system 100. Wireless communications system 200 may include a UE 205 and a number of TRPs 215, which may be examples of the corresponding devices described herein. TRPs 215 may, in this example, provide a multi-TRP Scell in which a first beam 220-*a* of a first TRP 215-*a* and a second beam 220-*b* of a second TRP 215-*b* provide communications with the UE 205.

In some cases, the multi-TRP transmissions may be configured based on multiple downlink control information n(DCI) communications, in which a first DCI (e.g., transmitted in PDCCH1 from first TRP 215-*a*) schedules a downlink shared channel transmission (e.g., PDSCH1 transmitted from first TRP 215-*a* via first beam 220-*a*), and a second DCI (e.g., transmitted in PDCCH2 from second TRP 215-*b*) schedules a second downlink shared channel transmission (e.g., PDSCH2 transmitted from second TRP 215-*b* via second beam 220-*b*). TRP 215 differentiation at the UE 205, in some cases, may be based on a value of a CORESET pool index (e.g., CORESETPoolIndex), where each CORESET (e.g., up to a maximum of five CORESETs) can be configured with a value of CORESET pool index. In some cases, the value of CORESET pool index can be zero or one, which groups the CORESETs in to two groups, which may correspond to the different TRPs 215. Only some CCs may be configured with two values of CORESET pool index, while other CCs may not be configured with two values of CORESET pool index and thus BFD/BFR for on a per-TRP 215 basis may be provided for CCs that are configured with two values of CORESET pool index.

In some cases, the UE 205 may be configured to provide per-TRP 215 BFR, which enables separate BFD and separate CBD for the beams corresponding to a TRP 215 in a CC that is configured with two values of CORESET pool index. In the absence of per-TRP 215 BFR, beam failure detection and beam candidate determination is not triggered until all beams in that CC become weak. With per-TRP 215 BFR, when beams for a given TRP become weak, recovery procedures can be done and best beam corresponding to that TRP 215 can be identified without having to wait for the beams of the other TRP 215 to also become weak, and thus reliability and communications efficiency can be enhanced. In the example, of FIG. 2, Scell 210 may be configured with two values of CORESET pool index, with one value associated with the first TRP 215-*a* and a second value associated with second TRP 215-*b*. In this case, each TRP 215 may transmit one or more BFD reference signals that may be monitored by the UE 205. In this example, the UE 205 may determine that the first beam 220-*a* of the first CORESET pool index value has a channel metric (e.g., a reference signal received power RSRP)) that is below a threshold value (e.g., when radio link quality is worse than a threshold $Q_{out}$ for all the reference signals in BFD resources that are associated with CORESET pool index value). Various examples of beam failure declaration, candidate beam detection, and beam recovery are discussed with reference to FIGS. 3 through 5.

Figure 3:
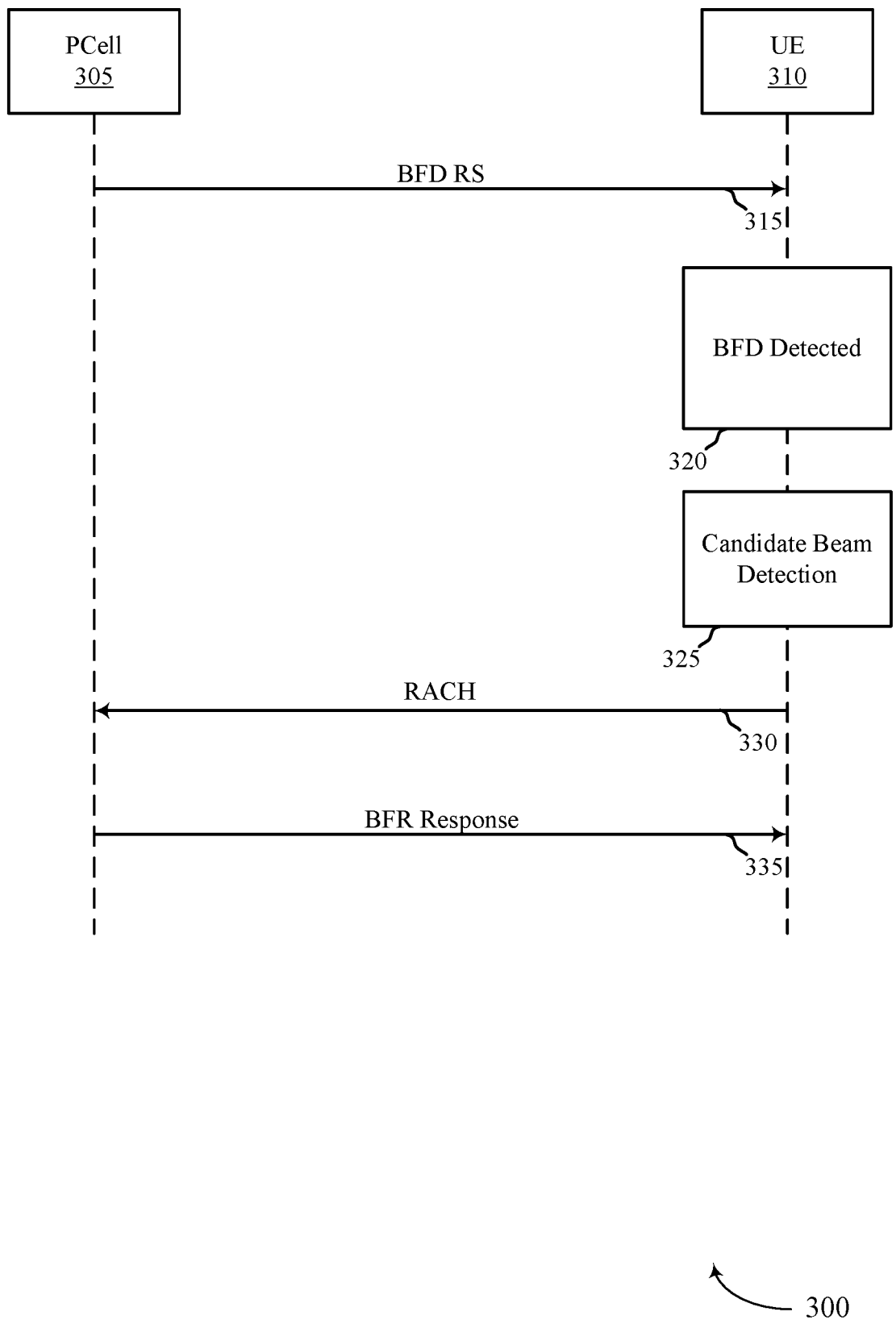
FIG. 3 illustrates an example of a process flow that supports beam failure recovery techniques for multiple transmission-reception points in a secondary cell in accordance with aspects of the present disclosure.

FIG. 3 illustrates an example of a process flow 300 that supports beam failure recovery techniques for multiple transmission-reception points in a secondary cell in accordance with aspects of the present disclosure. In some examples, process flow 300 may implement aspects of wireless communications system 100 or 200. Process flow 300 may be implemented by a UE 310 and a PCell 305 that has two values of CORESET pool index values (and is served by multiple different TRPs) as described herein. In the following description of the process flow 300, the communications between the UE 310 and the Pcell 305 may be transmitted in a different order than the example order shown, or the operations performed by the UE 310 and Pcell 305 may be performed in different orders or at different times. Some operations may also be omitted from the process flow 300, and other operations may be added to the process flow 300.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 315, the Pcell 305 may transmit, and UE 310 may receive, one or more BFD reference signals of a set of BFD reference signals. The UE 310 may measure one or more channel metrics of the BFD reference signals as part of a BFD process. In accordance with various aspects, the BFD reference signals may be transmitted by different TRPs, and have multiple CORESET pool index values, and the BFD reference signals have an indication of the associated CORESET pool index value (e.g., zero or one, based on a reference signal sequence that is configured to a CORESET pool index value).

At 320, the UE 310 may determine that a BFD is detected. In some cases, the detection of the BFD may be based on a channel metric of the reference signal being below a threshold value (e.g., $Q_{out}$). In some cases, the BFD may be based on periodic CSI-RS resources configured by RRC (e.g., configured by RRC parameter failureDetectionResources). In some cases, the BFD reference signals may include up to two reference signals on a single port. In the BFD reference signals are not configured, the reference signal sets indicated by the active TCI states of CORESETs monitored by the UE 310 may be used. If, for an active TCI state of a CORESET, there are 2 reference signal indices, the one with QCL-TypeD is used. The physical layer in the UE 310 may assess the radio link quality according to the BFD set against the threshold value (e.g., $Q_{out}$). If radio link quality is worse than $Q_{out}$ for all the reference signals in the BFD resource set, the UE 310 may declare a beam failure.

At 325, the UE 310 may perform candidate beam detection (CBD). In some cases, CBD may be based on periodic CSI-RS/SSB that are configured by RRC (e.g., configured by RRC parameter candidateBeamRSList). In some cases, up to 16 resources with the corresponding random access preamble index (e.g., ra-preamble-index) may be configured. The UE 310 may provide reference signal indices and the RSRP among the list that have equal or larger RSRP value than a threshold value (e.g., $Q_{in}$), which may be a configurable threshold.

At 330, the UE 310 may transmit a random access channel (RACH) request to the Pcell 305. In some cases, the UE 310 may initiate random access procedures (e.g., contention-free random access) based on the random access resource (e.g., ra-preamble-index) associated with a selected reference signal index with RSRP above the threshold (e.g., RS index q_new).

At 335, the Pcell 305 may transmit, and the UE 310 may receive, a BFR response. In some cases, the UE 310 may monitor PDCCH in a search space set provided by a RRC parameter (e.g., recoverySearchSpaceId) for detection of a DCI format with CRC scrambled by C-RNTI or MCS-C-RNTI starting from slot n+4. If the UE 310 receives the PDCCH within this window, BFR is completed. Following the BFR response, the UE 310 may use QCL assumptions that the same QCL parameters as associated with reference signal index q_new until the UE 310 receives an activation for a TCI state. In some cases, after 28 symbols from a last symbol of a first PDCCH reception where the UE 310 detects a DCI format with CRC scrambled by C-RNTI or MCS-C-RNTI, the UE 310 assumes same QCL parameters as the ones associated with RS index q_new for PDCCH monitoring in a CORESET with index 0.

In some cases, the Pcell may be configured with multiple TRPs, and the CORESET pool index may be configured with two values. In some cases, separate RACH resources may be configured for different CORESET pool index values, which may allow the UE 310 to indicate beam failure associated with a particular CORESET pool index value, which may be associated with a particular TRP. As discussed herein, in some cases one or more Scells may be configured with two values of CORESET pool index, and a UE may perform a BFD procedure for the Scell, an example of which is discussed with reference to FIG. 4.

Figure 4:
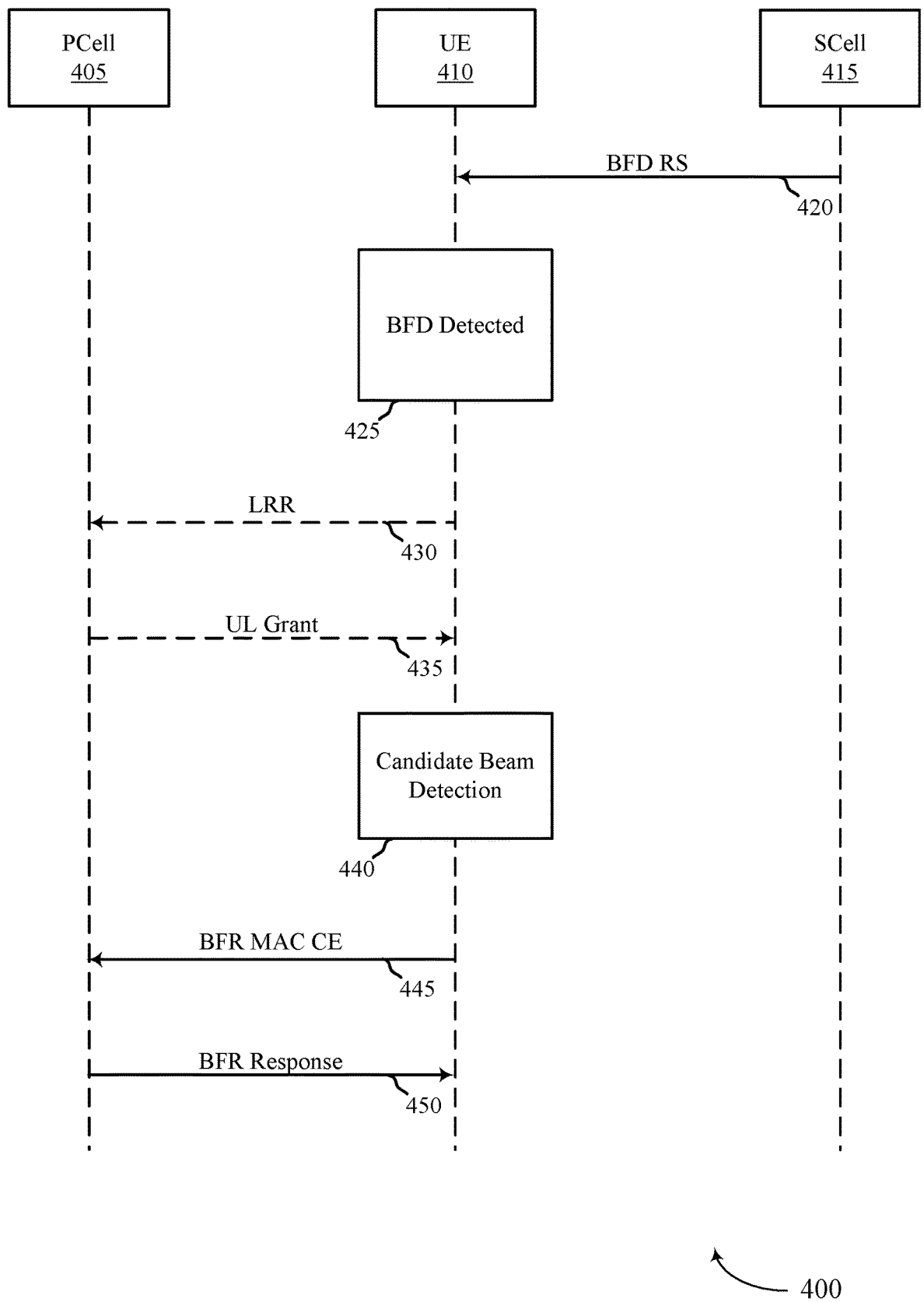
FIG. 4 illustrates another example of a process flow that supports beam failure recovery techniques for multiple transmission-reception points in a secondary cell in accordance with aspects of the present disclosure.

FIG. 4 illustrates an example of a process flow 400 that supports beam failure recovery techniques for multiple transmission-reception points in a secondary cell in accordance with aspects of the present disclosure. In some examples, process flow 400 may implement aspects of wireless communications system 100 or 200. Process flow 400 may be implemented by a UE 410 and a PCell 405 and a Scell 415, where the Scell 415 may have two values of CORESET pool index values (and is served by multiple different TRPs) as described herein. In the following description of the process flow 400, the communications between the UE 410, the Pcell 405, and the Scell 415 may be transmitted in a different order than the example order shown, or the operations performed by the UE 410, Pcell 405, and Scell 415 may be performed in different orders or at different times. Some operations may also be omitted from the process flow 400, and other operations may be added to the process flow 400.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 420, the Scell 415 may transmit, and UE 410 may receive, one or more BFD reference signals of a set of BFD reference signals. The UE 410 may measure one or more channel metrics of the BFD reference signals as part of a BFD process. In accordance with various aspects, the BFD reference signals may be transmitted by different TRPs, and have multiple CORESET pool index values, and the BFD reference signals have an indication of the associated CORESET pool index value (e.g., zero or one, based on a reference signal sequence that is configured to a CORESET pool index value).

At 420, the UE 410 may determine that a BFD is detected. In some cases, similarly as discussed with reference to FIG. 3, the detection of the BFD may be based on a channel metric of the reference signal being below a threshold value (e.g., $Q_{out}$). In some cases, the BFD may be based on periodic CSI-RS resources configured by RRC (e.g., configured by RRC parameter failureDetectionResources). In some cases, the BFD reference signals may include up to two reference signals on a single port. If the BFD reference signals are not configured, the reference signal sets indicated by the active TCI states of CORESETs monitored by the UE 410 may be used. If, for an active TCI state of a CORESET, there are 2 reference signal indices, the one with QCL-TypeD is used. The physical layer in the UE 410 may assess the radio link quality according to the BFD set against the threshold value (e.g., $Q_{out}$). If radio link quality is worse than $Q_{out}$ for all the reference signals in the BFD resource set, the UE 410 may declare a beam failure.

In one example, two sets of failure detection resources may be configured, each corresponding to a different CORESET pool index value. In another example, each resource within the failure detection resources used to transmit the BFD reference signals may be configured with a CORESET pool index value. In some cases, if a resource is not configured with a CORESET pool index value, it is assumed to be associated with CORESET pool index value zero. In some cases, a BFD reference signal resource may be configured with both values of CORESET pool index, in which case the associated reference signal is considered for both TRPs. In some case, when failure detection resources are not configured, reference signal sets indicated by the active TCI states of CORESETs configured with CORESET pool index zero or one determines the first and second sets of resources, respectively. In some cases, a beam failure for a value of CORESET pool index is declared when radio link quality is worse than the configured threshold value (e.g., $Q_{out}$) for all the reference signals in the BFD resources that are associated with that CORESET pool index value.

At 430, the UE 410 may transmit a link recovery request (LRR) on the Pcell 405. In some cases, the LRR may be transmitted on a Pcell, on a primary Scell (Pscell), or on a Scell that is configured for PUCCH (a PUCCH-Scell) in which PUCCH BFR is configured. The LRR may indicate that the UE 410 is requesting uplink resources (e.g., similar to a scheduling request (SR), and may use PUCCH format 0 or 1. In some cases, two PUCCH resources can be configured for LRR (e.g., indicated by schedulingRequestID-BFR-Scell) by two corresponding scheduling request IDs. The two PUCCH resources or scheduling request IDs may be associated with the two values of CORESET pool index. If BFD is declared for a value of CORESET pool index in Scell 415, in some cases, the PUCCH resource/scheduling request ID that corresponds to the other value of CORESET pool index may be used for LRR transmission. Such a selection of resources provides that if the beams of Scell 415 and a PUCCH-cell are the same, and if all beams for one TRP become weak, LRR is transmitted using a beam corresponding to the other TRP. Such a rule may be applied, for example, when the CC with PUCCH-BFR is in the same band as the Scell 415.

In other cases, the PUCCH resource/scheduling request ID that corresponds to the same value of CORESET pool index is used for LRR transmission. Such a selection may provide that LRR is transmitted to the same TRP for non-ideal backhaul scenario. Such a rule may be followed, for example, when separate feedback is configured for different cells (ACKNACKFeedbackMode=SeparateFeedback). In other cases, the PUCCH resource/scheduling request ID that corresponds to CORESET pool index=0 is used for LRR transmission. Such a rule can be followed, for example, when the CC with PUCCH-BFR is in a different band than the Scell 415. In still other cases, Both PUCCH resources/scheduling request ID's may be used to transmit LRR irrespective of the CORESET pool index for which BFD is declared. This means that multiple instances of the LRR transmission are provided across the two PUCCH resources (and is transmitted to both TRPs).

At 435, the Pcell 405 may provide an uplink grant to the UE 410. Such an uplink grant may be a normal uplink grant with C-RNTI/MCS-C-RNTI that can serve as response to LRR, which the UE 410 may use to schedule a PUSCH in which a BFR MAC-CE can be transmitted. It is noted that in some cases the UE 410 may have an existing uplink grant, in which cases the LRR and associated uplink grant operations may be skipped.

At 440, the UE 410 may perform a CBD procedure. Before sending the MAC-CE with the beam failure recovery message, the UE 410 may first identify one or more candidate beams for the failed Scell. The CBD process may be performed in a similar manner as discussed with reference to FIG. 3, with the exception that the procedure is for Scell 415. In some cases, up to 64 resources (e.g., indicated in RRC in candidateBeamRSSCellList-r16), which can be transmitted on the failed Scell 415 or another CC in the same band. In some cases, each candidate beam is associated with a CORESET pool index value. In one example, two lists of candidate beams may be provided (e.g., two lists for parameter candidateBeamRSSCellList-r16 are configured) each corresponding to a CORESET pool index value. In another example, each reference signal in the list of candidate beams (e.g., in candidateBeamRSSCellList-r16) may be configured with a CORESET pool index value. In some cases, if a reference signal is not configured with a CORESET pool index value, it is assumed to be associated with CORESET pool index value zero. In addition, it can be allowed for a reference signal to be configured with both values of CORESET pool index, in which case it is considered for both TRPs. When BFD is declared for a value of CORESET pool index, a candidate beam may be identified only within reference signals that are associated with the same value of CORESET pool index.

At 445, the UE 410 may transmit a beam failure recovery message in a BFR MAC-CE. Examples of the BFR MAC-CE are discussed herein with reference to FIG. 5. The BFR MAC-CE is transmitted using the resources provided in the uplink grant, and can be sent on any cell, including failed SCell 415. In some cases, the UE 410 may indicate the CORESET pool index value in the Scell MAC-CE for the corresponding Scell 415. Such an indication may be provided, in some cases, in accordance with the examples discussed with reference to FIG. 5.

At 450, the Pcell 405 may provide a BFR response to the UE 410. In some cases, the response may be an uplink grant to schedule a new transmission (e.g., with a toggled new data indicator (NDI)) for the same HARQ process as the PUSCH carrying the BFR MAC-CE. In some cases, if a new beam corresponding to a value of CORESET pool index in an Scell 415 is reported in the BFR MAC-CE, after 28 symbols from the end of the BFR response (end of PDCCH), the UE 410 may use a QCL assumption that only the CORESETs with the same value of CORESET pool index are reset to the new beam (e.g., $q_{new}$) in the Scell 415. Assuming that PUCCH resources are also associated with a value of CORESET pool index, spatial relation for only those PUCCH resources that are associated with the same value of CORESET pool index are reset to the new beam in the Scell 415 when the Scell 415 is PUCCH-Scell. If PUCCH resources are not associated with a value of CORESET pool index, and if BFR MAC-CE indicates BFD and candidate beams for both values of CORESET pool index (e.g., two $q_{new}$ in the Scell 415), PUCCH beams are reset to the candidate beam corresponding to CORESET pool index=0 (when Scell is PUCCH-Scell).

Thus, in some cases the UE 410 may reset the beams for one or more PUCCH resources associated with the same value as the CORESET pool index value of the identified candidate beam, when the secondary cell is configured for uplink control information transmissions. Further, in some cases, the UE 410 may reset the beams for one or more PUCCH resources in response to the CORESET pool index value of the identified candidate beam having a first value (e.g., CORESET pool index=0), and refraining from resetting the beams for the one or more PUCCH resources in response to the CORESET pool index value of the identified candidate beam having a second value (e.g., CORESET pool index=1), when the secondary cell is configured for uplink control information transmissions.

Figure 5:
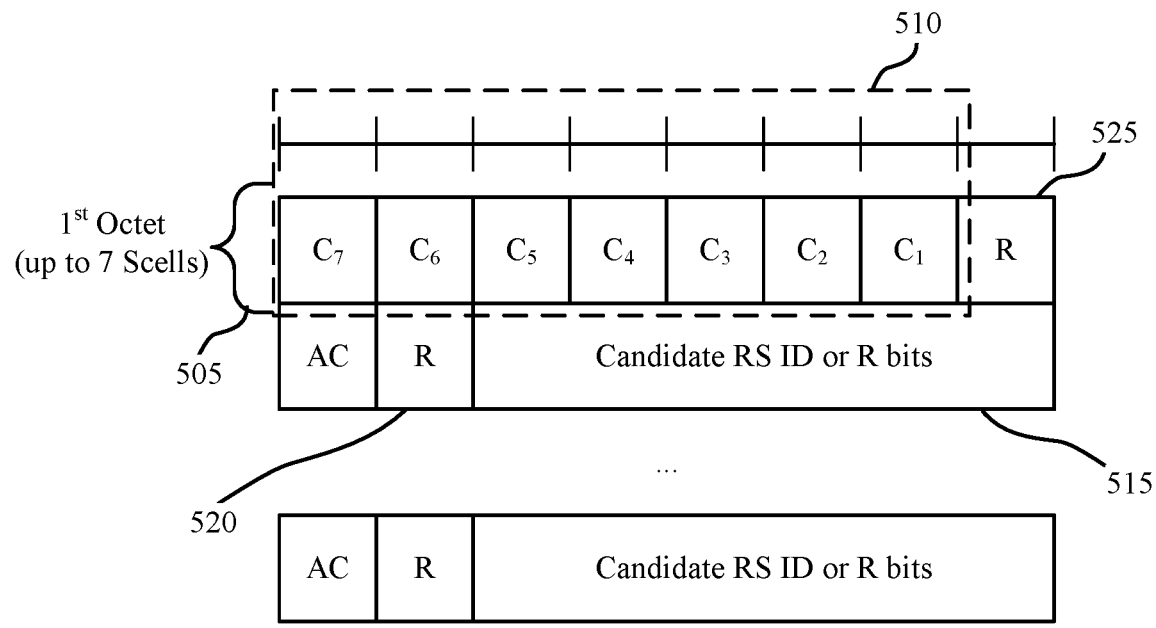
FIG. 5 illustrates an example of a beam failure recovery message that supports beam failure recovery techniques for multiple transmission-reception points in a secondary cell in accordance with aspects of the present disclosure.

FIG. 5 illustrates an example of a beam failure recovery message 500 (e.g., a BFR MAC-CE) that supports beam failure recovery techniques for multiple transmission-reception points in a secondary cell in accordance with aspects of the present disclosure. In some examples, beam failure recovery message 500 may implement aspects of wireless communications system 100 or 200. In this example, a MAC-CE is illustrated in which a first octet 505 includes indications of Scells. In this example, the illustrated MAC-CE may include information for up to seven Scells, using a first subset of bits 510 of the first octet 505. In other examples, more than seven Scells may be present, or more than seven combinations of Scells and associated different CORESET pool index values may be present, and additional octets may be configured that include indication of Scells or Scells and CORESET pool index values.

In this example, the first octet 505 includes a second subset of bits 525 that provides a reserved bit, and in some cases may be used to indicate whether the whole MAC-CE applies to a particular CORESET pool index value. A number of additional octets may be provided in the MAC-CE, which may each indicate a candidate reference signal ID or R bits 515 and may also include a reserved field 520 that in some cases may be used to indicate an associated CORESET pool index value. In some cases, a number of additional octets may depend upon how many Scells and candidate beams are reported in the MAC-CE.

In some examples, the candidate reference signal ID 515 may implicitly indicate the CORESET pool index value (e.g., if the reference signal ID is mapped or otherwise associated with that CORESET pool index value). Such an option may be used in cases where a candidate beam list (e.g., a candidatebeamRSSCellList) contains all reference signals, and separate lists are not configured. In some cases, the candidate reference signal ID 515 may be a third subset of bits of the MAC-CE.

In other cases, if a value of $C_i=1$ for the Scell (indicating that a candidate beam is indicated in the MAC-CE for the Scell), the reserved field 520 in the corresponding octet may be used to indicate the value of CORESET pool index.

In other examples, the entire MAC-CE may correspond to a value of CORESET pool index. In such cases, the second subset of bits 525 in the first octet indicates which CORESET pool index value. In such cases, if $C_i=1$ for an Scell that is not configured with two values of CORESET pool index, the indicated CORESET pool index in the MAC-CE does not apply.

In further examples, for the Scell, separate $C_i$ fields may indicate BFD/candidate beam that correspond to first or second CORESET pool index values. In such cases, the $C_i$'s may be ordered with respect to a serving cell index of the Scells, as well as with respect to the CORESET pool index values for those Scells configured with two values of CORESET pool index. In some cases, the $C_i$ fields may be first ordered with respect to the serving cell index, and then with respect to the CORESET pool index value. In other cases, the $C_i$ fields may be first ordered with respect to CORESET pool index value, then serving cell index. In this example, the number of $C_i$ fields depends on how many Scells are configured with two values of CORESET pool index. In some cases different formats of MAC-CE may be used depending upon the number of Scells to be reported, and a first format such as illustrated in FIG. 5 may be used when the number of $C_i$ fields based on above is seven or smaller, and a second format may otherwise be used that includes additional octets that can provide additional $C_i$ fields.

Figure 6:
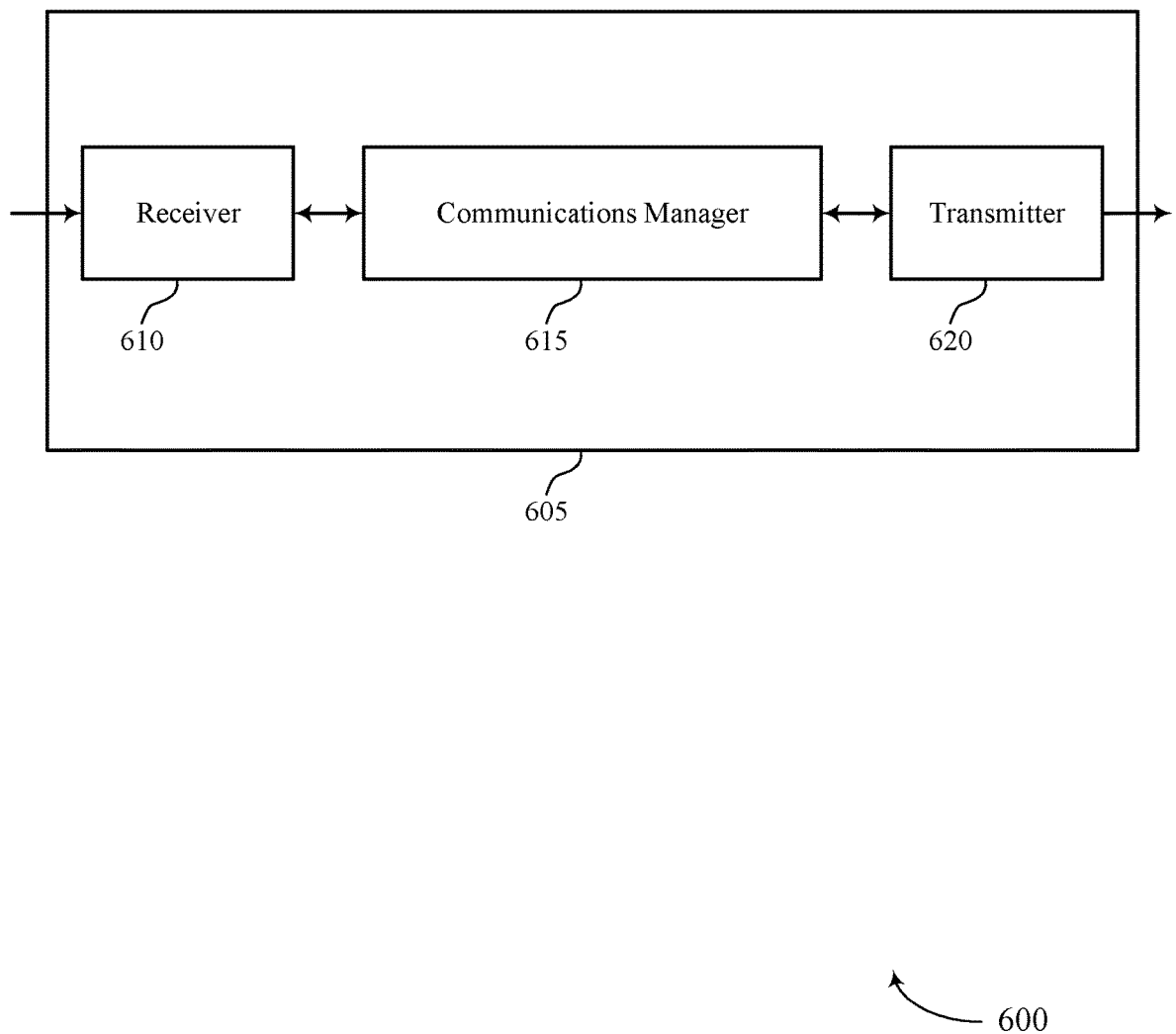
FIGS. 6 and 7 show block diagrams of devices that support beam failure recovery techniques for multiple transmission-reception points in a secondary cell in accordance with aspects of the present disclosure.

FIG. 6 shows a block diagram 600 of a device 605 that supports beam failure recovery techniques for multiple transmission-reception points in a secondary cell in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to beam failure recovery techniques for multiple transmission-reception points in a secondary cell, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may establish a connection using a first set of one or more beams and a second set of one or more beams, where each of the first set of one or more beams and the second set of one or more beams are associated with a serving cell of the UE, determine to declare a beam failure for the first set of one or more beams based on a channel metric associated with the first set of one or more beams dropping below a threshold criteria, select, responsive to the determining to declare the beam failure, one or more of a first uplink control resource or a second uplink control resource for transmission of a recovery request message, and transmit the recovery request message via the selected uplink control resource.

The communications manager 615 may also establish a connection with at least a first transmission-reception point using a first set of one or more beams and a second transmission-reception point using a second set of one or more beams, where each of the first transmission-reception point and the second transmission-reception point are associated with a secondary cell used for communications at the UE, determine to declare a beam failure for the first transmission-reception point based on a channel metric associated with the first set of one or more beams dropping below a threshold criteria, identify a candidate beam associated with one of the first transmission-reception point or the second transmission-reception point that has an associated channel metric that meets the threshold criteria, and transmit a beam failure recovery message to one of the first transmission-reception point or the second transmission-reception point that indicates the candidate beam and which of the first transmission-reception point or the second transmission-reception point is associated with the candidate beam. The communications manager 615 may be an example of aspects of the communications manager 910 described herein.

The communications manager 615 may as described herein be implemented to realize one or more potential advantages. One implementation may allow the device 605 to provide BFD indications and candidate beams for particular TRPs in Scells that use multiple TRPs, which may enhance the overall channel quality of the Scell and allow for indication of failed beams of particular TRPs before an overall failure of the Scell. Further, such implementations may allow the device 605 to increase communications reliability, throughput, and user experience, while reducing overall power consumption, among other advantages.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
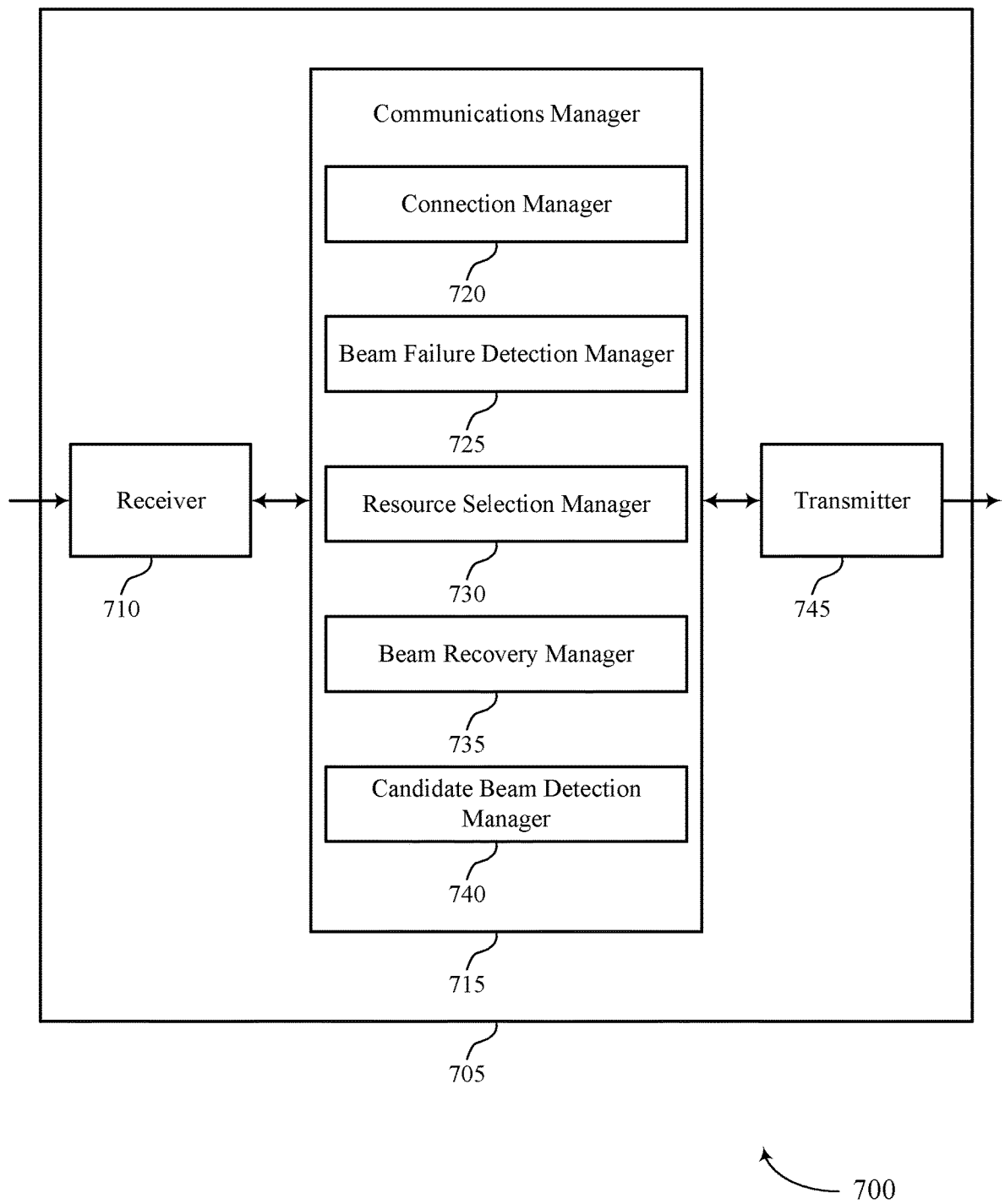

FIG. 7 shows a block diagram 700 of a device 705 that supports beam failure recovery techniques for multiple transmission-reception points in a secondary cell in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to beam failure recovery techniques for multiple transmission-reception points in a secondary cell, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a connection manager 720, a beam failure detection manager 725, a resource selection manager 730, a beam recovery manager 735, and a candidate beam detection manager 740. The communications manager 715 may be an example of aspects of the communications manager 910 described herein.

In some cases, the connection manager 720 may establish a connection using a first set of one or more beams and a second set of one or more beams, where each of the first set of one or more beams and the second set of one or more beams are associated with a serving cell of the UE. The beam failure detection manager 725 may determine to declare a beam failure for the first set of one or more beams based on a channel metric associated with the first set of one or more beams dropping below a threshold criteria. The resource selection manager 730 may select, responsive to the determining to declare the beam failure, one or more of a first uplink control resource or a second uplink control resource for transmission of a recovery request message. The beam recovery manager 735 may transmit the recovery request message via the selected uplink control resource.

In some cases, the connection manager 720 may establish a connection with at least a first transmission-reception point using a first set of one or more beams and a second transmission-reception point using a second set of one or more beams, where each of the first transmission-reception point and the second transmission-reception point are associated with a secondary cell used for communications at the UE. The beam failure detection manager 725 may determine to declare a beam failure for the first transmission-reception point based on a channel metric associated with the first set of one or more beams dropping below a threshold criteria. The candidate beam detection manager 740 may identify a candidate beam associated with one of the first transmission-reception point or the second transmission-reception point that has an associated channel metric that meets the threshold criteria. The beam recovery manager 735 may transmit a beam failure recovery message to one of the first transmission-reception point or the second transmission-reception point that indicates the candidate beam and which of the first transmission-reception point or the second transmission-reception point is associated with the candidate beam.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
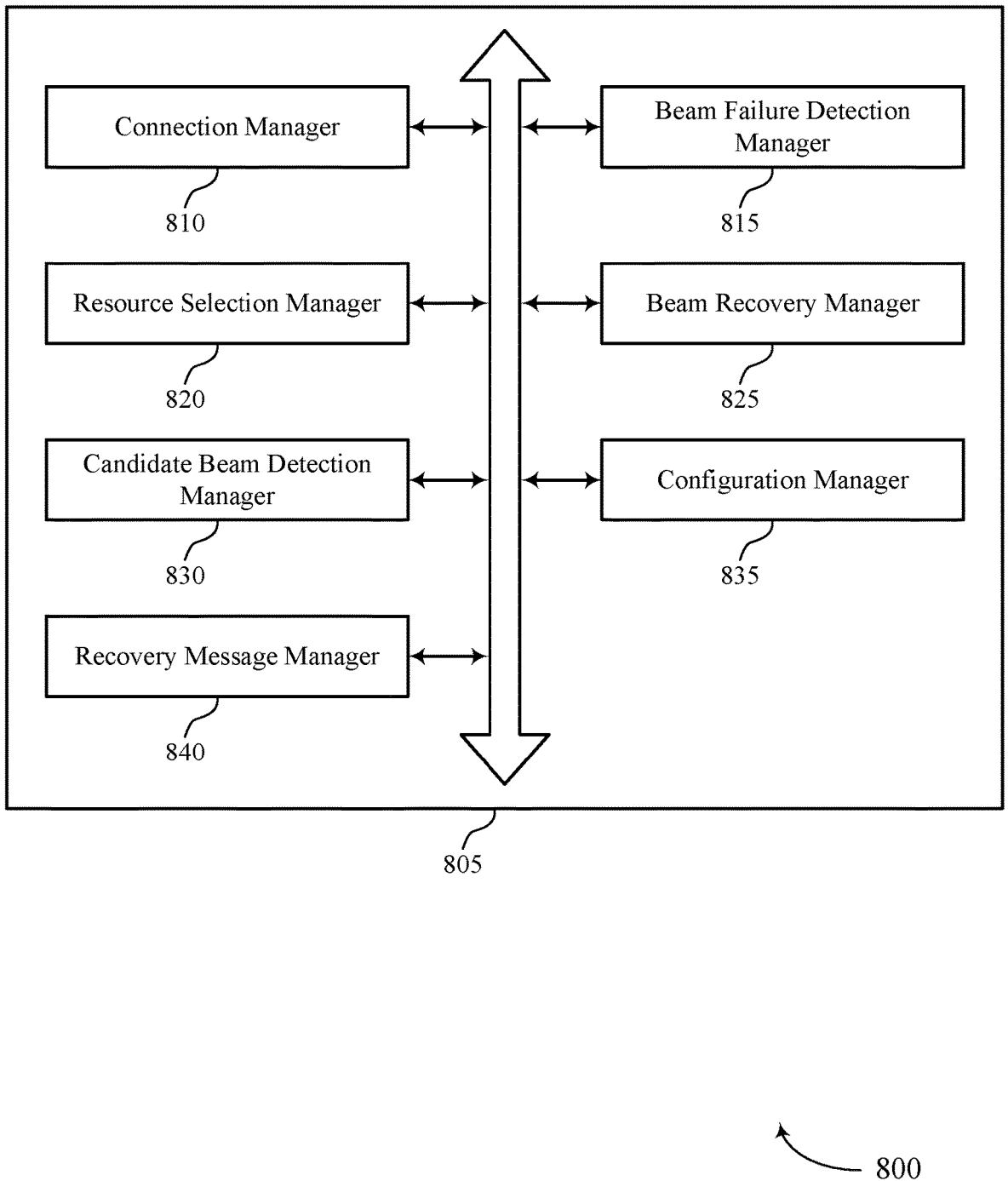
FIG. 8 shows a block diagram of a communications manager that supports beam failure recovery techniques for multiple transmission-reception points in a secondary cell in accordance with aspects of the present disclosure.

FIG. 8 shows a block diagram 800 of a communications manager 805 that supports beam failure recovery techniques for multiple transmission-reception points in a secondary cell in accordance with aspects of the present disclosure. The communications manager 805 may be an example of aspects of a communications manager 615, a communications manager 715, or a communications manager 910 described herein. The communications manager 805 may include a connection manager 810, a beam failure detection manager 815, a resource selection manager 820, a beam recovery manager 825, a candidate beam detection manager 830, a configuration manager 835, and a recovery message manager 840. Each of these modules may communicate, directly or indirectly, with one another (e.g., via one or more buses).

The connection manager 810 may establish a connection using a first set of one or more beams and a second set of one or more beams, where each of the first set of one or more beams and the second set of one or more beams are associated with a serving cell of the UE.

In some examples, the connection manager 810 may reset the beams for one or more control resource sets with a same value as a control resource set pool index value of an identified candidate beam of a BFR process. In some cases, a transmission beam for transmitting uplink control information, when the secondary cell is configured for uplink control information transmissions, corresponds to the identified candidate beam, or corresponds to a different beam having a different control resource set pool index value than the identified candidate beam.

The beam failure detection manager 815 may determine to declare a beam failure for the first set of one or more beams based on a channel metric associated with the first set of one or more beams dropping below a threshold criteria. In some examples, the beam failure detection manager 815 may measure a first set of one or more reference signals corresponding to the first set of one or more beams and a second set of one or more reference signals corresponding to the second set of one or more beams, where the first set of one or more reference signals and the first set of one or more beams are associated with a first control resource set pool index value, and the second set of one or more reference signals and the second set of one or more beams are associated with a second control resource set pool index value, and where the determining to declare the beam failure is based on the channel metric associated with the first set of one or more reference signals being below the threshold criteria.

The resource selection manager 820 may select, responsive to the determining to declare the beam failure, one or more of a first uplink control resource or a second uplink control resource for transmission of a recovery request message. In some examples, the resource selection manager 820 may select the second uplink control resource associated with a second control resource set pool index value of the serving cell for transmission of the recovery request message. In some examples, the resource selection manager 820 may select the first uplink control resource associated with a first control resource set pool index value of the serving cell for transmission of the recovery request message. In some examples, the resource selection manager 820 may select the first uplink control resource or the second uplink control resource based on which of the first uplink control resource or the second uplink control resource is associated with a lowest control resource set pool index value. In some examples, the resource selection manager 820 may different instances of the recovery request message are transmitted via each of the first uplink control resource and the second uplink control resource.

In some cases, the first uplink control resource is associated with a first scheduling request identification and the second uplink control resource is associated with a second scheduling request identification. In some cases, the first uplink control resource is associated with a first control resource set pool index value and the second uplink control resource is associated with a second control resource set pool index value. In some cases, the second uplink control resource is selected based on a component carrier used to transmit the recovery request message being in a same frequency band as the serving cell. In some cases, the first uplink control resource is selected based on a feedback configuration that indicates separate feedback is to be provided using the first control resource set pool index value of the serving cell and a second control resource set pool index value of the serving cell. In some cases, the lowest control resource set pool index value is used for selection of the first uplink control resource or the second uplink control resource when a component carrier used to transmit the recovery request message is in a different frequency band than a frequency band of the serving cell.

In some cases, each of the first set of one or more beams are associated with a first TRP of the serving cell and the second set of one or more beams are associated with a second TRP of the serving cell of the UE. In some cases, the first uplink control resource is associated with a first TRP of the serving cell and the second uplink control resource is associated with a second TRP of the serving cell. In some cases, the first control resource set pool index value is associated with a first TRP of the serving cell and the second control resource set pool index value is associated with a second TRP of the serving cell.

The beam recovery manager 825 may transmit the recovery request message via the selected uplink control resource. In some examples, the beam recovery manager 825 may transmit a beam failure recovery message to one of the first transmission-reception point or the second transmission-reception point that indicates the candidate beam and which of the first transmission-reception point or the second transmission-reception point is associated with the candidate beam.

In some examples, the beam recovery manager 825 may receive, responsive to the recovery request message, an uplink grant for an uplink communication. In some examples, the beam recovery manager 825 may transmit, responsive to the receiving the uplink grant, the uplink communication that indicates at least the identified candidate beam and an associated control resource set pool index value of the serving cell. In some examples, the beam recovery manager 825 may transmit, responsive to the determining to declare the beam failure, a recovery request message to one or more of the first transmission-reception point via a first uplink control resource or the second transmission-reception point via a second uplink control resource.

The candidate beam detection manager 830 may identify a candidate beam associated with one of the first transmission-reception point or the second transmission-reception point that has an associated channel metric that meets the threshold criteria. In some examples, the candidate beam detection manager 830 may identify a candidate beam that has an associated channel metric that meets the threshold criteria or one or more other criteria.

In some examples, the candidate beam detection manager 830 may determine a control resource set pool index value of the identified candidate beam, where the selected uplink control resource is determined based on the identified candidate beam. In some examples, the candidate beam detection manager 830 may measure the first set of one or more reference signals and the second set of one or more reference signals. In some examples, the candidate beam detection manager 830 may identify a candidate beam based on the measuring.

In some examples, the candidate beam detection manager 830 may determine which of the first transmission-reception point or the second transmission-reception point is associated with the identified candidate beam based on the configuration information. In some cases, a set of reference signal identifications are configured at the UE prior to the determining in a reference signal identification list.

The configuration manager 835 may receive configuration information that indicates a first set of reference signals associated with a first control resource set pool index value and a second set of reference signals associated with a second control resource set pool index value.

The recovery message manager 840 may format a recovery message associated with the BFD. In some cases, the beam failure recovery message is a medium access control (MAC) control element and includes a reference signal identification of the candidate beam, and where the reference signal identification indicates the transmission-reception point associated with the candidate beam. In some cases, the beam failure recovery message includes a first set of bits that indicates which of the first transmission-reception point or the second transmission-reception point is associated with the identified candidate beam and a second set of bits that indicates the identified candidate beam. In some cases, the first set of bits and the second set of bits are provided for each of one or more component carriers for which the beam failure is declared. In some cases, the beam failure recovery message includes a first set of bits that indicates which of the first transmission-reception point or the second transmission-reception point is associated with the identified candidate beam, a second set of bits that indicates one or more component carriers for which the beam failure is declared, and a third set of bits that indicates that indicates the identified candidate beam.

In some cases, the beam failure recovery message includes a first set of bits that indicate which of a set of component carriers for which the beam failure is declared, and a second set of bits that indicates the identified candidate beam associated with each indicated component carrier, and where the transmission-reception point associated with the identified candidate beam is indicated based on an ordering of the first set of bits. In some cases, the set of component carriers are ordered in the first set of bits according to a component carrier index value or a control resource set pool index value of the associated component carrier. In some cases, the first set of bits includes a number of bits that is based on a number of component carriers that are configured for communications with multiple transmission-reception points.

Figure 9:
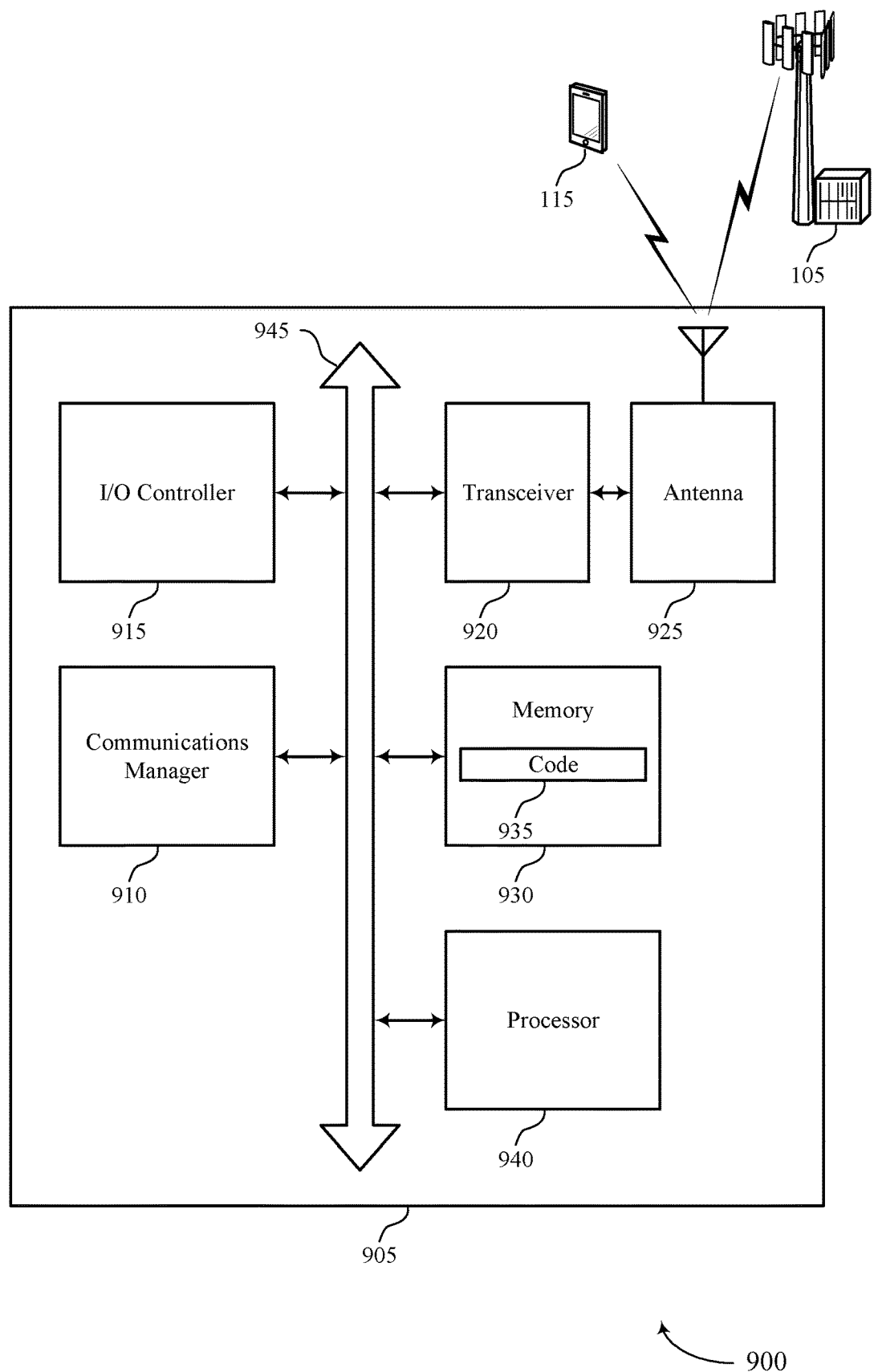
FIG. 9 shows a diagram of a system including a device that supports beam failure recovery techniques for multiple transmission-reception points in a secondary cell in accordance with aspects of the present disclosure.

FIG. 9 shows a diagram of a system 900 including a device 905 that supports beam failure recovery techniques for multiple transmission-reception points in a secondary cell in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may establish a connection using a first set of one or more beams and a second set of one or more beams, where each of the first set of one or more beams and the second set of one or more beams are associated with a serving cell of the UE, determine to declare a beam failure for the first set of one or more beams based on a channel metric associated with the first set of one or more beams dropping below a threshold criteria, select, responsive to the determining to declare the beam failure, one or more of a first uplink control resource or a second uplink control resource for transmission of a recovery request message, and transmit the recovery request message via the selected uplink control resource.

The communications manager 910 may also establish a connection with at least a first transmission-reception point using a first set of one or more beams and a second transmission-reception point using a second set of one or more beams, where each of the first transmission-reception point and the second transmission-reception point are associated with a secondary cell used for communications at the UE, determine to declare a beam failure for the first transmission-reception point based on a channel metric associated with the first set of one or more beams dropping below a threshold criteria, identify a candidate beam associated with one of the first transmission-reception point or the second transmission-reception point that has an associated channel metric that meets the threshold criteria, and transmit a beam failure recovery message to one of the first transmission-reception point or the second transmission-reception point that indicates the candidate beam and which of the first transmission-reception point or the second transmission-reception point is associated with the candidate beam.

The communications manager 910 may as described herein be implemented to realize one or more potential advantages. One implementation may allow the device 905 to provide BFD indications and candidate beams for particular TRPs in Scells that use multiple TRPs, which may enhance the overall channel quality of the Scell and allow for indication of failed beams of particular TRPs before an overall failure of the Scell. Further, such implementations may allow the device 905 to increase communications reliability, throughput, and user experience, while reducing overall power consumption, among other advantages.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting beam failure recovery techniques for multiple transmission-reception points in a secondary cell).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
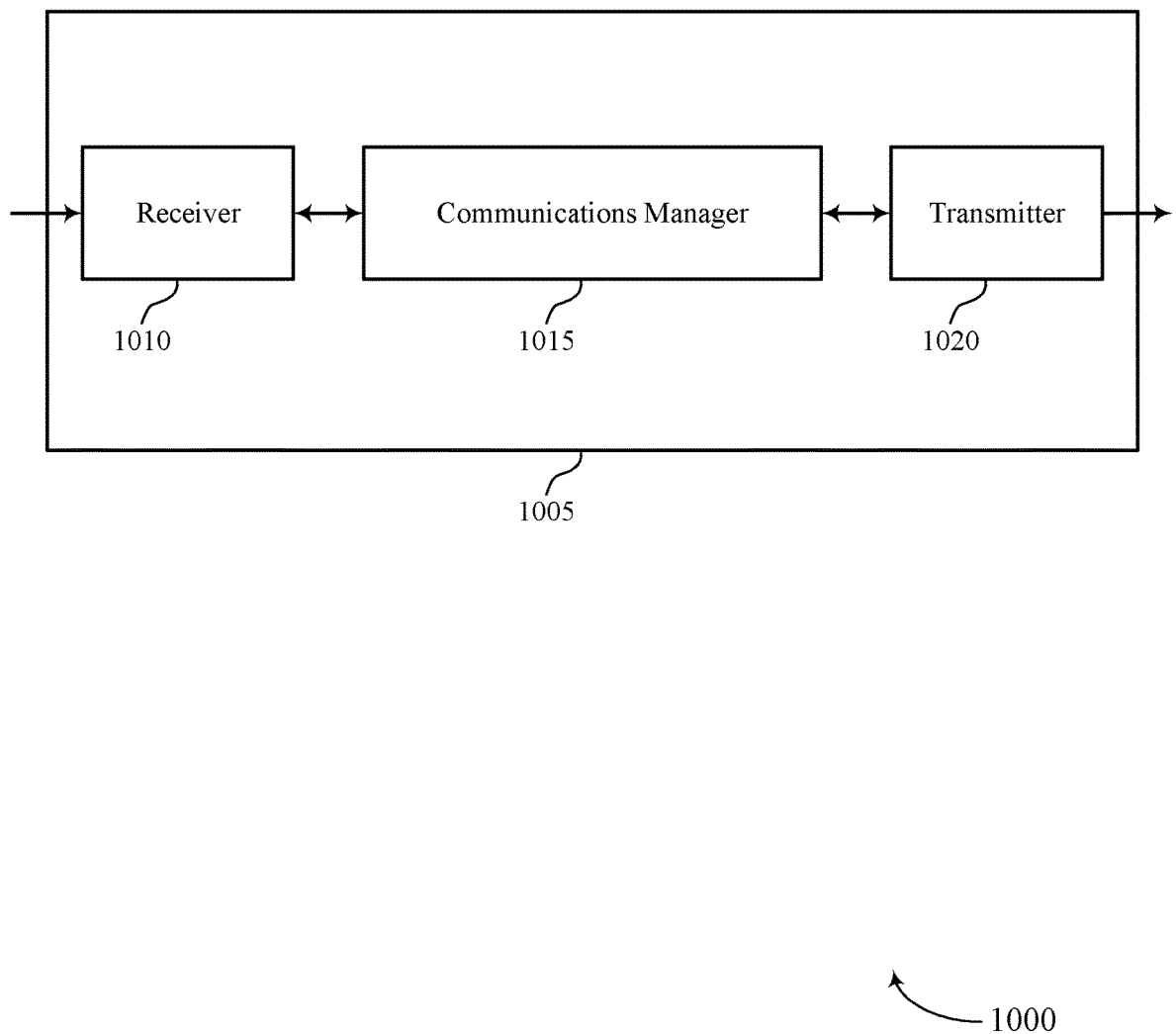
FIGS. 10 and 11 show block diagrams of devices that support beam failure recovery techniques for multiple transmission-reception points in a secondary cell in accordance with aspects of the present disclosure.

FIG. 10 shows a block diagram 1000 of a device 1005 that supports beam failure recovery techniques for multiple transmission-reception points in a secondary cell in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to beam failure recovery techniques for multiple transmission-reception points in a secondary cell, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may establish communications with a UE via a serving cell, where communications via the serving cell use at least a first set of one or more beams of the serving cell and a second set of one or more beams of the serving cell, configure a first uplink control resource and a second uplink control resource for transmission of a recovery request message that indicates a beam failure of the serving cell at the UE, receive the recovery request message from the UE in the first uplink control resource, and determine, based on the recovery request message, that the UE has declared the beam failure.

The communications manager 1015 may also establish communications with a UE via a primary cell and a secondary cell, where communications via the secondary cell use at least a first transmission-reception point using a first beam and a second transmission-reception point using a second beam, communicate with the UE via the candidate beam responsive to the beam failure recovery message, configure a beam failure recovery message for transmission by the UE that indicates a beam failure of the secondary cell at the UE, and receive the beam failure recovery message from the UE that indicates a candidate beam and which of the first transmission-reception point or the second transmission-reception point is associated with the candidate beam. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
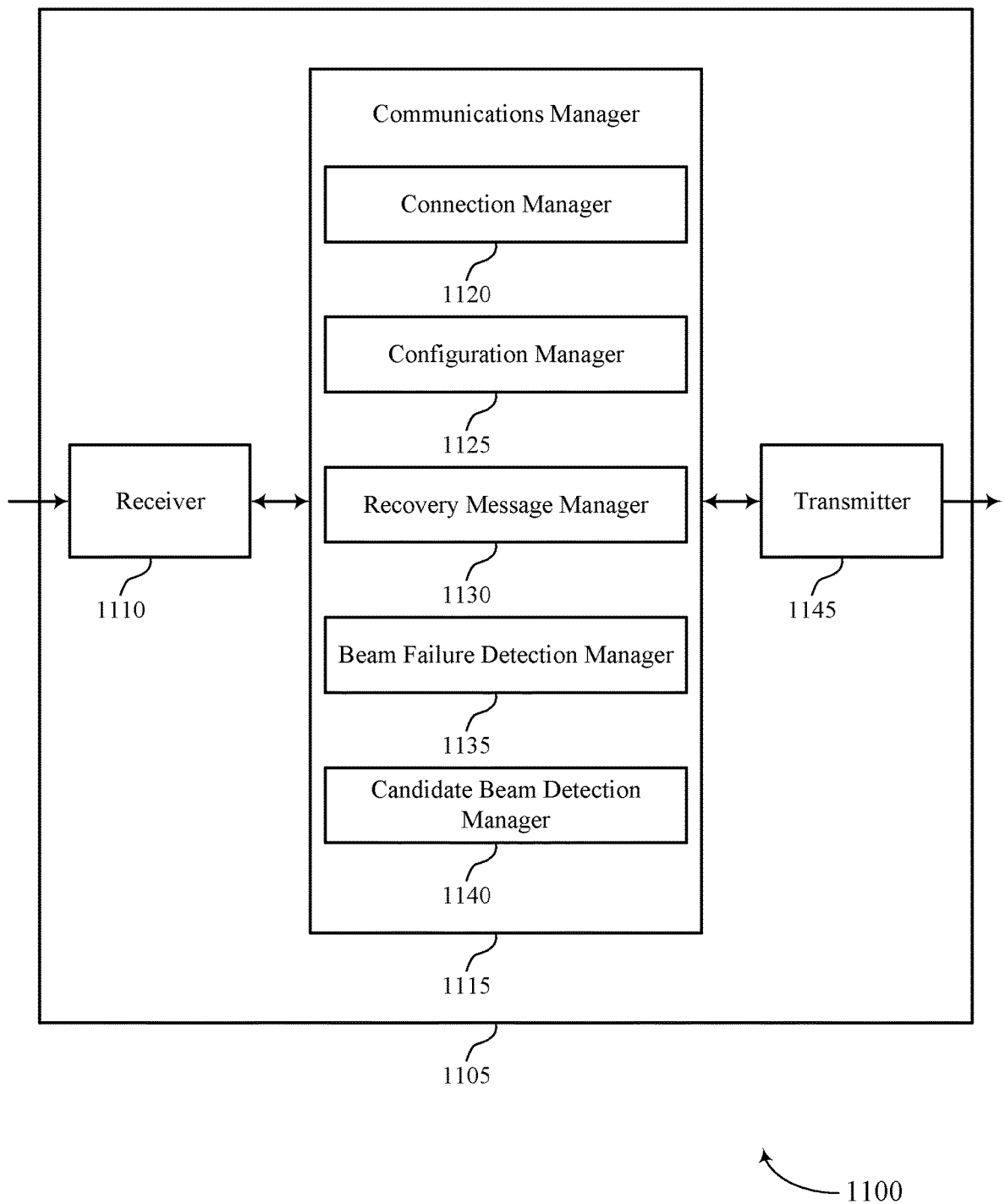

FIG. 11 shows a block diagram 1100 of a device 1105 that supports beam failure recovery techniques for multiple transmission-reception points in a secondary cell in accordance with aspects of the present disclosure. The device 1105 may be an example of aspects of a device 1005, or a base station 105 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to beam failure recovery techniques for multiple transmission-reception points in a secondary cell, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a connection manager 1120, a configuration manager 1125, a recovery message manager 1130, a beam failure detection manager 1135, and a candidate beam detection manager 1140. The communications manager 1115 may be an example of aspects of the communications manager 1310 described herein.

In some cases, the connection manager 1120 may establish communications with a UE via a serving cell, where communications via the serving cell use at least a first set of one or more beams of the serving cell and a second set of one or more beams of the serving cell. The configuration manager 1125 may configure a first uplink control resource and a second uplink control resource for transmission of a recovery request message that indicates a beam failure of the serving cell at the UE. The recovery message manager 1130 may receive the recovery request message from the UE in the first uplink control resource. The beam failure detection manager 1135 may determine, based on the recovery request message, that the UE has declared the beam failure.

In some cases, the connection manager 1120 may establish communications with a UE via a primary cell and a secondary cell, where communications via the secondary cell use at least a first transmission-reception point using a first beam and a second transmission-reception point using a second beam and communicate with the UE via the candidate beam responsive to the beam failure recovery message. The recovery message manager 1130 may configure a beam failure recovery message for transmission by the UE that indicates a beam failure of the secondary cell at the UE. The candidate beam detection manager 1140 may receive the beam failure recovery message from the UE that indicates a candidate beam and which of the first transmission-reception point or the second transmission-reception point is associated with the candidate beam.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
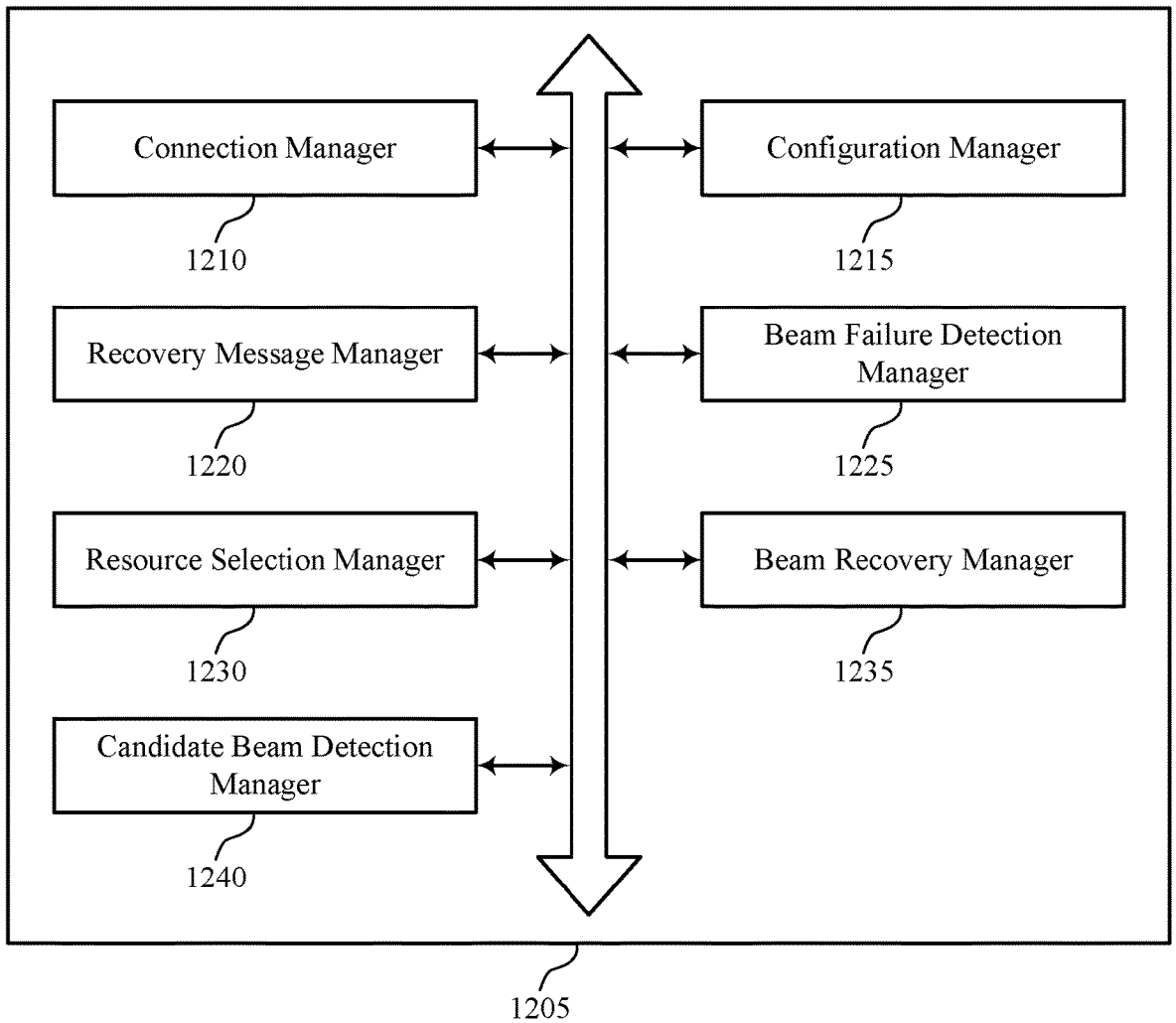
FIG. 12 shows a block diagram of a communications manager that supports beam failure recovery techniques for multiple transmission-reception points in a secondary cell in accordance with aspects of the present disclosure.

FIG. 12 shows a block diagram 1200 of a communications manager 1205 that supports beam failure recovery techniques for multiple transmission-reception points in a secondary cell in accordance with aspects of the present disclosure. The communications manager 1205 may be an example of aspects of a communications manager 1015, a communications manager 1115, or a communications manager 1310 described herein. The communications manager 1205 may include a connection manager 1210, a configuration manager 1215, a recovery message manager 1220, a beam failure detection manager 1225, a resource selection manager 1230, a beam recovery manager 1235, and a candidate beam detection manager 1240. Each of these modules may communicate, directly or indirectly, with one another (e.g., via one or more buses).

The connection manager 1210 may establish communications with a UE via a serving cell, where communications via the serving cell use at least a first set of one or more beams of the serving cell and a second set of one or more beams of the serving cell.

In some examples, the connection manager 1210 may establish communications with a UE via a primary cell and a secondary cell, where communications via the secondary cell use at least a first transmission-reception point using a first beam and a second transmission-reception point using a second beam.

In some examples, the connection manager 1210 may communicate with the UE via the candidate beam responsive to the beam failure recovery message. In some examples, the connection manager 1210 may communicate with the UE using the identified candidate beam subsequent to the reception of the uplink control channel communication.

The configuration manager 1215 may configure a first uplink control resource and a second uplink control resource for transmission of a recovery request message that indicates a beam failure of the serving cell at the UE. In some examples, the configuration manager 1215 may configure a first set of failure detection resources corresponding to a first control resource set pool index for the first transmission-reception point and a second set of failure detection resources corresponding to a second control resource set pool index for the second transmission-reception point, and where the beam failure recovery message is communicated using the set of failure detection resources that corresponds to one of the first transmission-reception point or the second transmission-reception point. In some cases, a set of reference signal identifications are configured at the UE in a reference signal identification list.

The recovery message manager 1220 may receive the recovery request message from the UE in the first uplink control resource. In some examples, the recovery message manager 1220 may configure a beam failure recovery message for transmission by the UE that indicates a beam failure of the secondary cell at the UE. In some cases, the beam failure recovery message is a medium access control (MAC) control element and includes a reference signal identification of the candidate beam, and where the reference signal identification indicates the transmission-reception point associated with the candidate beam.

In some cases, the beam failure recovery message includes a first set of bits that indicates which of the first transmission-reception point or the second transmission-reception point is associated with the identified candidate beam and a second set of bits that indicates the identified candidate beam. In some cases, the first set of bits and the second set of bits are provided for each of one or more component carriers for which the beam failure is declared.

In some cases, the beam failure recovery message includes a first set of bits that indicates which of the first transmission-reception point or the second transmission-reception point is associated with the identified candidate beam, a second set of bits that indicates one or more component carriers for which the beam failure is declared, and a third set of bits that indicates that indicates the identified candidate beam.

In some cases, the beam failure recovery message includes a first set of bits that indicate which of a set of component carriers for which the beam failure is declared, and a second set of bits that indicates the identified candidate beam associated with each indicated component carrier, and where the transmission-reception point associated with the identified candidate beam is indicated based on an ordering of the first set of bits.

In some cases, the set of component carriers are ordered in the first set of bits according to a component carrier index and a control resource set pool index value of the associated component carrier. In some cases, the first set of bits includes a number of bits that is based on a number of component carriers that are configured for communications with multiple transmission-reception points. In some cases, a format of the beam recovery message is selected from two or more available formats based on a number of component carriers that are configured for communications with multiple transmission-reception points.

The beam failure detection manager 1225 may determine, based on the recovery request message, that the UE has declared the beam failure. The candidate beam detection manager 1240 may receive the beam failure recovery message from the UE that indicates a candidate beam and which of the first transmission-reception point or the second transmission-reception point is associated with the candidate beam.

The resource selection manager 1230 may configure two or more control resource set pools with reference signal identifications associated with a first transmission-reception point of the serving cell or a second transmission-reception point of the serving cell, and where the beam failure is based on a channel metric associated with a first reference signal being below the threshold criteria, and where the first uplink control resource is determined based on the control resource set pool of a candidate beam that is indicated in the recovery request message. In some examples, different instances of the recovery request message are received via each of the first uplink control resource and the second uplink control resource.

In some cases, the first uplink control resource is associated with a first scheduling request identification and the second uplink control resource is associated with a second scheduling request identification, and where the recovery request message indicates the first scheduling request identification or the second scheduling request identification. In some cases, the first uplink control resource is associated with a first control resource set pool index value of a first beam of the first set of one or more beams and the second uplink control resource is associated with a second control resource set pool index value of a second beam of the second set of one or more beams. In some cases, the second uplink control resource is associated with a second TRP that is used for transmission of the recovery request message. In some cases, the second uplink control resource is selected based on a component carrier used to transmit the recovery request message being in a same frequency band at a first beam of the first set of one or more beams and a second beam of the second set of one or more beams.

In some cases, the first uplink control resource associated with the first transmission-reception point is selected for transmission of the recovery request message. In some cases, the first uplink control resource is selected based on a feedback configuration that indicates separate feedback is to be provided for communications from the first transmission-reception point and the second transmission-reception point.

In some cases, the first uplink control resource or the second uplink control resource is selected based on which of the first uplink control resource or the second uplink control resource is associated with a lowest control resource set pool index value. In some cases, the lowest control resource set pool index value is used for selection of the first uplink control resource or the second uplink control resource when a component carrier used to transmit the recovery request message is in a different frequency band than a first beam of the first set of one or more beams and a second beam of the second set of one or more beams.

The beam recovery manager 1235 may transmit, responsive to the recovery request message, an uplink grant to the UE for an uplink communication. In some examples, the beam recovery manager 1235 may receive, responsive to the uplink grant, the uplink communication that indicates the candidate beam and an associated control resource set pool index value of the serving cell.

In some examples, the beam recovery manager 1235 may receive, prior to the receiving the beam failure recovery message, a recovery request message. In some examples, the beam recovery manager 1235 may transmit an uplink grant to the UE for the beam failure recovery message.

Figure 13:
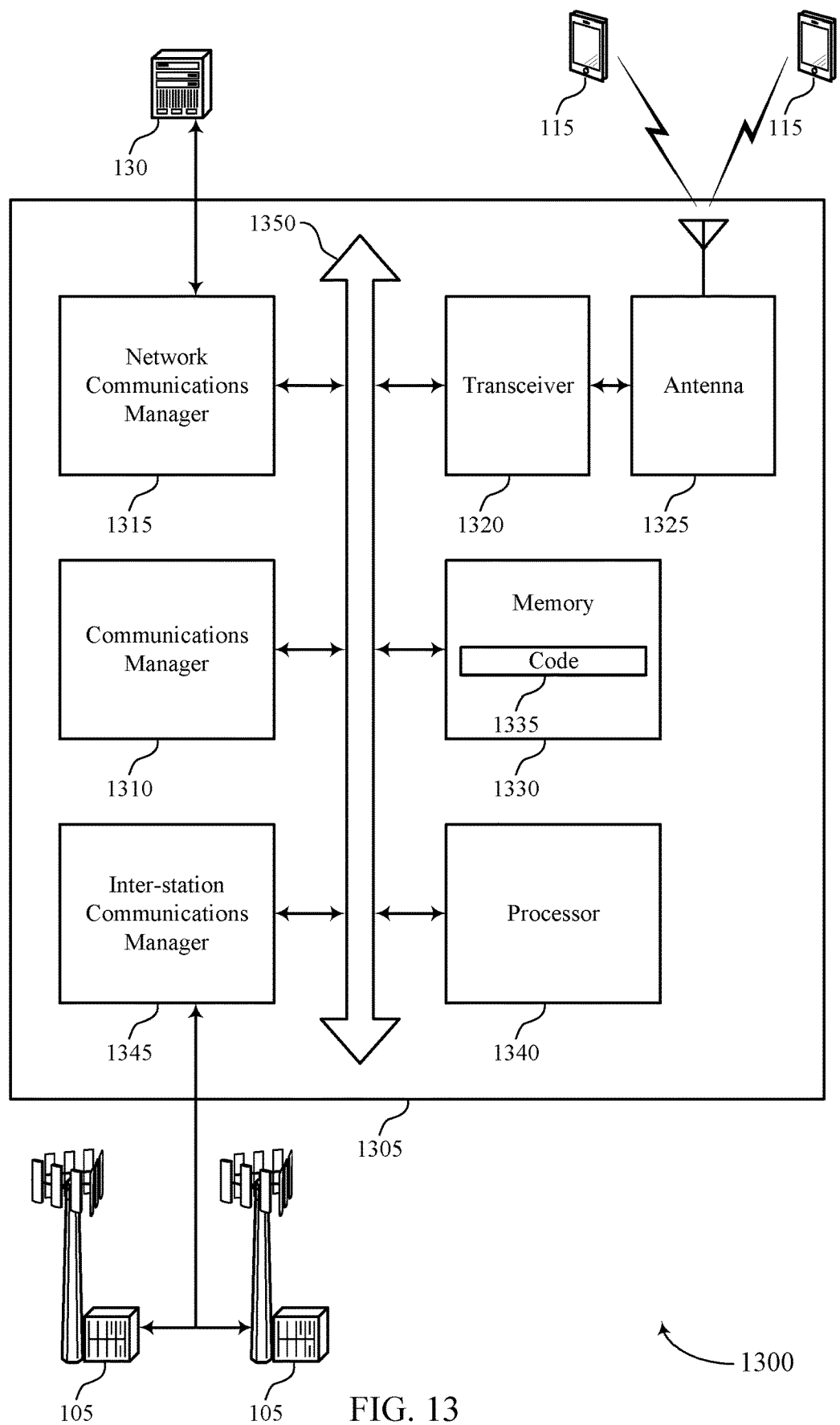
FIG. 13 shows a diagram of a system including a device that supports beam failure recovery techniques for multiple transmission-reception points in a secondary cell in accordance with aspects of the present disclosure.

FIG. 13 shows a diagram of a system 1300 including a device 1305 that supports beam failure recovery techniques for multiple transmission-reception points in a secondary cell in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may establish communications with a UE via a serving cell, where communications via the serving cell use at least a first set of one or more beams of the serving cell and a second set of one or more beams of the serving cell, configure a first uplink control resource and a second uplink control resource for transmission of a recovery request message that indicates a beam failure of the serving cell at the UE, receive the recovery request message from the UE in the first uplink control resource, and determine, based on the recovery request message, that the UE has declared the beam failure.

The communications manager 1310 may also establish communications with a UE via a primary cell and a secondary cell, where communications via the secondary cell use at least a first transmission-reception point using a first beam and a second transmission-reception point using a second beam, communicate with the UE via the candidate beam responsive to the beam failure recovery message, configure a beam failure recovery message for transmission by the UE that indicates a beam failure of the secondary cell at the UE, and receive the beam failure recovery message from the UE that indicates a candidate beam and which of the first transmission-reception point or the second transmission-reception point is associated with the candidate beam.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting beam failure recovery techniques for multiple transmission-reception points in a secondary cell).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
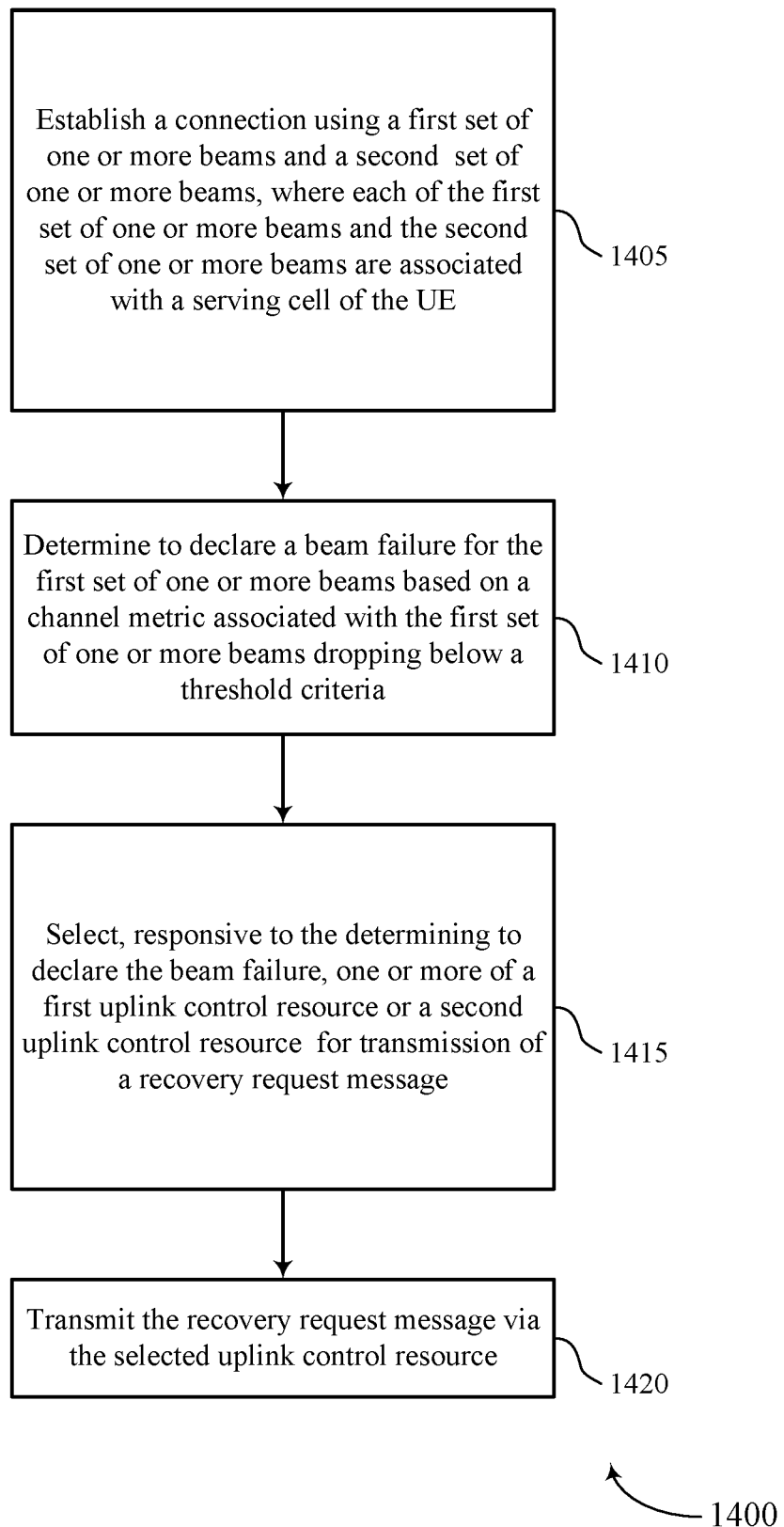
FIGS. 14 through 22 show flowcharts illustrating methods that support beam failure recovery techniques for multiple transmission-reception points in a secondary cell in accordance with aspects of the present disclosure.

FIG. 14 shows a flowchart illustrating a method 1400 that supports beam failure recovery techniques for multiple transmission-reception points in a secondary cell in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may establish a connection using a first set of one or more beams and a second set of one or more beams, where each of the first set of one or more beams and the second set of one or more beams are associated with a serving cell of the UE. The operations of 1405 may be performed according to the methods described herein. In some examples, aspects of the operations of 1405 may be performed by a connection manager as described with reference to FIGS. 6 through 9.

At 1410, the UE may determine to declare a beam failure for the first set of one or more beams based on a channel metric associated with the first set of one or more beams dropping below a threshold criteria. The operations of 1410 may be performed according to the methods described herein. In some examples, aspects of the operations of 1410 may be performed by a beam failure detection manager as described with reference to FIGS. 6 through 9.

At 1415, the UE may select, responsive to the determining to declare the beam failure, one or more of a first uplink control resource or a second uplink control resource for transmission of a recovery request message. The operations of 1415 may be performed according to the methods described herein. In some examples, aspects of the operations of 1415 may be performed by a resource selection manager as described with reference to FIGS. 6 through 9.

At 1420, the UE may transmit the recovery request message via the selected uplink control resource. The operations of 1420 may be performed according to the methods described herein. In some examples, aspects of the operations of 1420 may be performed by a beam recovery manager as described with reference to FIGS. 6 through 9.

Figure 15:
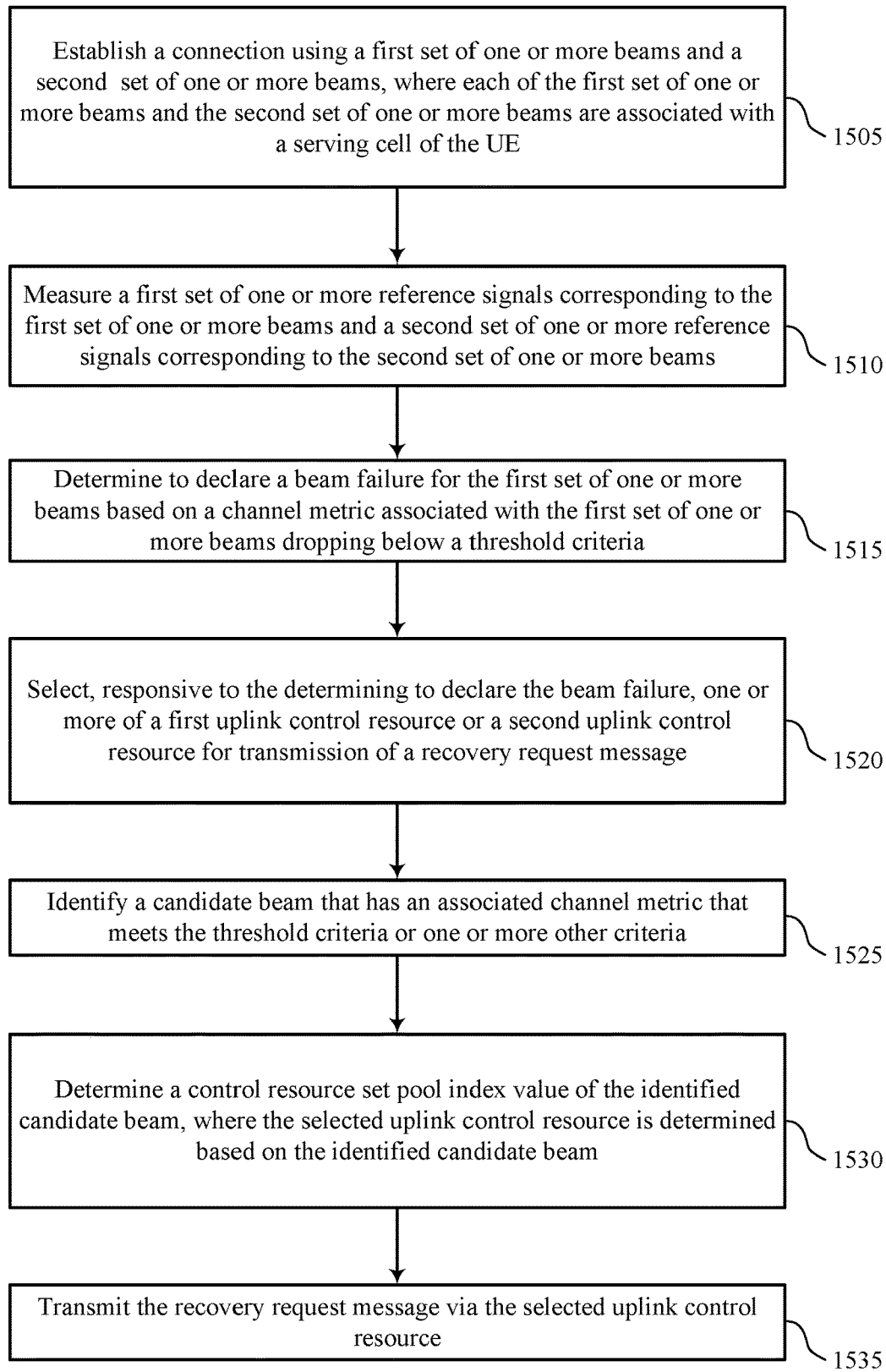

FIG. 15 shows a flowchart illustrating a method 1500 that supports beam failure recovery techniques for multiple transmission-reception points in a secondary cell in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may establish a connection using a first set of one or more beams and a second set of one or more beams, where each of the first set of one or more beams and the second set of one or more beams are associated with a serving cell of the UE. The operations of 1505 may be performed according to the methods described herein. In some examples, aspects of the operations of 1505 may be performed by a connection manager as described with reference to FIGS. 6 through 9.

At 1510, the UE may measure a first set of one or more reference signals corresponding to the first set of one or more beams and a second set of one or more reference signals corresponding to the second set of one or more beams. The operations of 1510 may be performed according to the methods described herein. In some examples, aspects of the operations of 1510 may be performed by a beam failure detection manager as described with reference to FIGS. 6 through 9. In some cases, the first set of one or more reference signals and the first set of one or more beams are associated with a first control resource set pool index value, and the second set of one or more reference signals and the second set of one or more beams are associated with a second control resource set pool index value.

At 1515, the UE may determine to declare a beam failure for the first set of one or more beams based on a channel metric associated with the first set of one or more beams dropping below a threshold criteria. The operations of 1515 may be performed according to the methods described herein. In some examples, aspects of the operations of 1515 may be performed by a beam failure detection manager as described with reference to FIGS. 6 through 9.

At 1520, the UE may select, responsive to the determining to declare the beam failure, one or more of a first uplink control resource or a second uplink control resource for transmission of a recovery request message. The operations of 1520 may be performed according to the methods described herein. In some examples, aspects of the operations of 1520 may be performed by a resource selection manager as described with reference to FIGS. 6 through 9.

At 1525, the UE may identify a candidate beam that has an associated channel metric that meets the threshold criteria or one or more other criteria. The operations of 1525 may be performed according to the methods described herein. In some examples, aspects of the operations of 1525 may be performed by a candidate beam detection manager as described with reference to FIGS. 6 through 9.

At 1530, the UE may determine a control resource set pool index value of the identified candidate beam, where the selected uplink control resource is determined based on the identified candidate beam. The operations of 1530 may be performed according to the methods described herein. In some examples, aspects of the operations of 1530 may be performed by a candidate beam detection manager as described with reference to FIGS. 6 through 9.

At 1535, the UE may transmit the recovery request message via the selected uplink control resource. The operations of 1535 may be performed according to the methods described herein. In some examples, aspects of the operations of 1535 may be performed by a beam recovery manager as described with reference to FIGS. 6 through 9.

Figure 16:
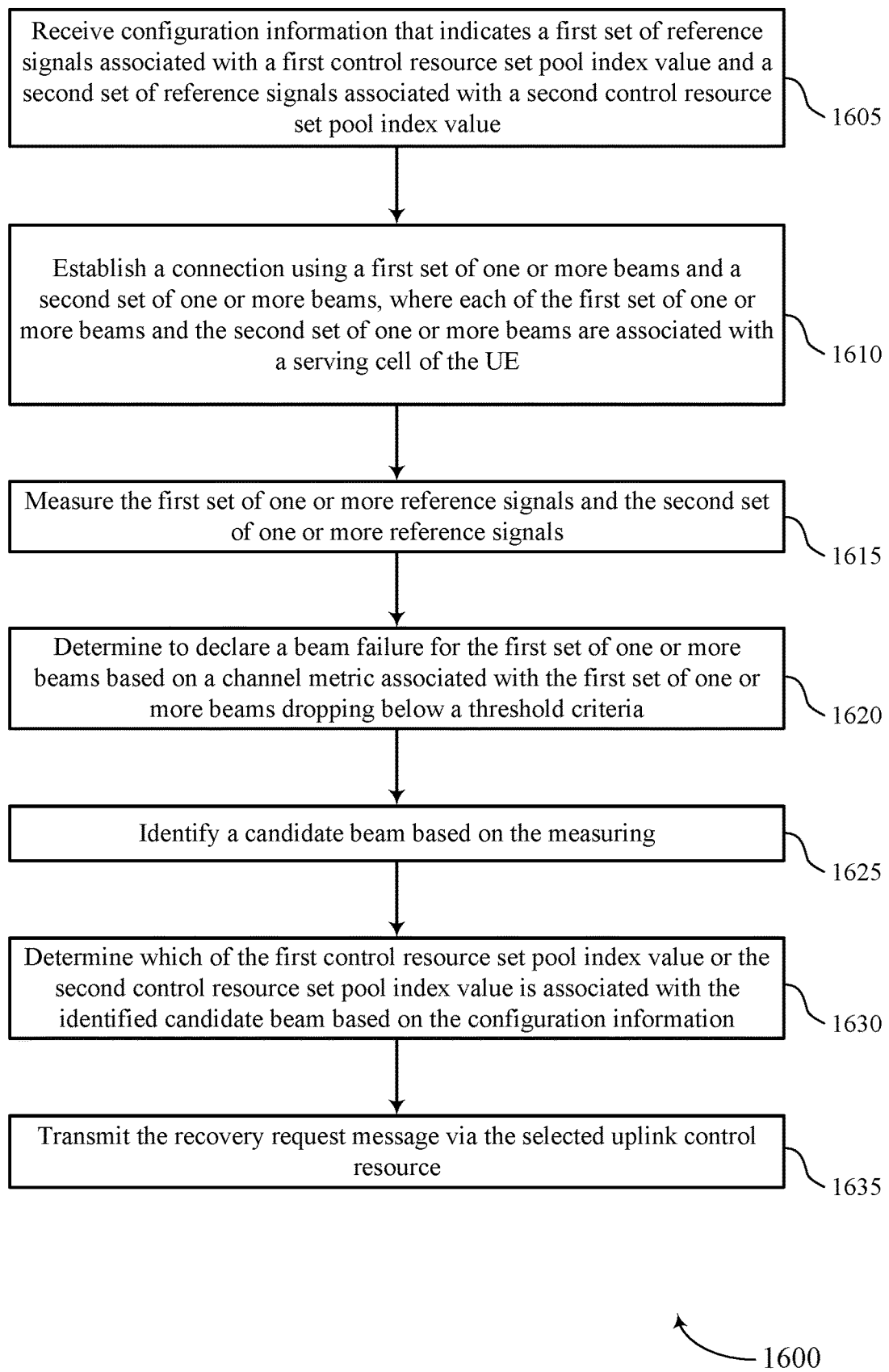

FIG. 16 shows a flowchart illustrating a method 1600 that supports beam failure recovery techniques for multiple transmission-reception points in a secondary cell in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive configuration information that indicates a first set of reference signals associated with a first control resource set pool index value and a second set of reference signals associated with a second control resource set pool index value. The operations of 1605 may be performed according to the methods described herein. In some examples, aspects of the operations of 1605 may be performed by a configuration manager as described with reference to FIGS. 6 through 9.

At 1610, the UE may establish a connection using a first set of one or more beams and a second set of one or more beams, where each of the first set of one or more bits and the second set of one or more bits are associated with a serving cell of the UE. The operations of 1610 may be performed according to the methods described herein. In some examples, aspects of the operations of 1610 may be performed by a connection manager as described with reference to FIGS. 6 through 9.

At 1615, the UE may measure the first set of one or more reference signals and the second set of one or more reference signals. The operations of 1615 may be performed according to the methods described herein. In some examples, aspects of the operations of 1615 may be performed by a candidate beam detection manager as described with reference to FIGS. 6 through 9.

At 1620, the UE may determine to declare a beam failure for the first set of one or more beams based on a channel metric associated with the first set of one or more beams dropping below a threshold criteria. The operations of 1620 may be performed according to the methods described herein. In some examples, aspects of the operations of 1620 may be performed by a beam failure detection manager as described with reference to FIGS. 6 through 9.

At 1625, the UE may identify a candidate beam based on the measuring. The operations of 1625 may be performed according to the methods described herein. In some examples, aspects of the operations of 1625 may be performed by a candidate beam detection manager as described with reference to FIGS. 6 through 9.

At 1630, the UE may determine which of the first control resource set pool index value or the second control resource set pool index value is associated with the identified candidate beam based on the configuration information. The operations of 1630 may be performed according to the methods described herein. In some examples, aspects of the operations of 1630 may be performed by a candidate beam detection manager as described with reference to FIGS. 6 through 9.

At 1635, the UE may transmit the recovery request message via the selected uplink control resource. The operations of 1635 may be performed according to the methods described herein. In some examples, aspects of the operations of 1635 may be performed by a beam recovery manager as described with reference to FIGS. 6 through 9.

Figure 17:
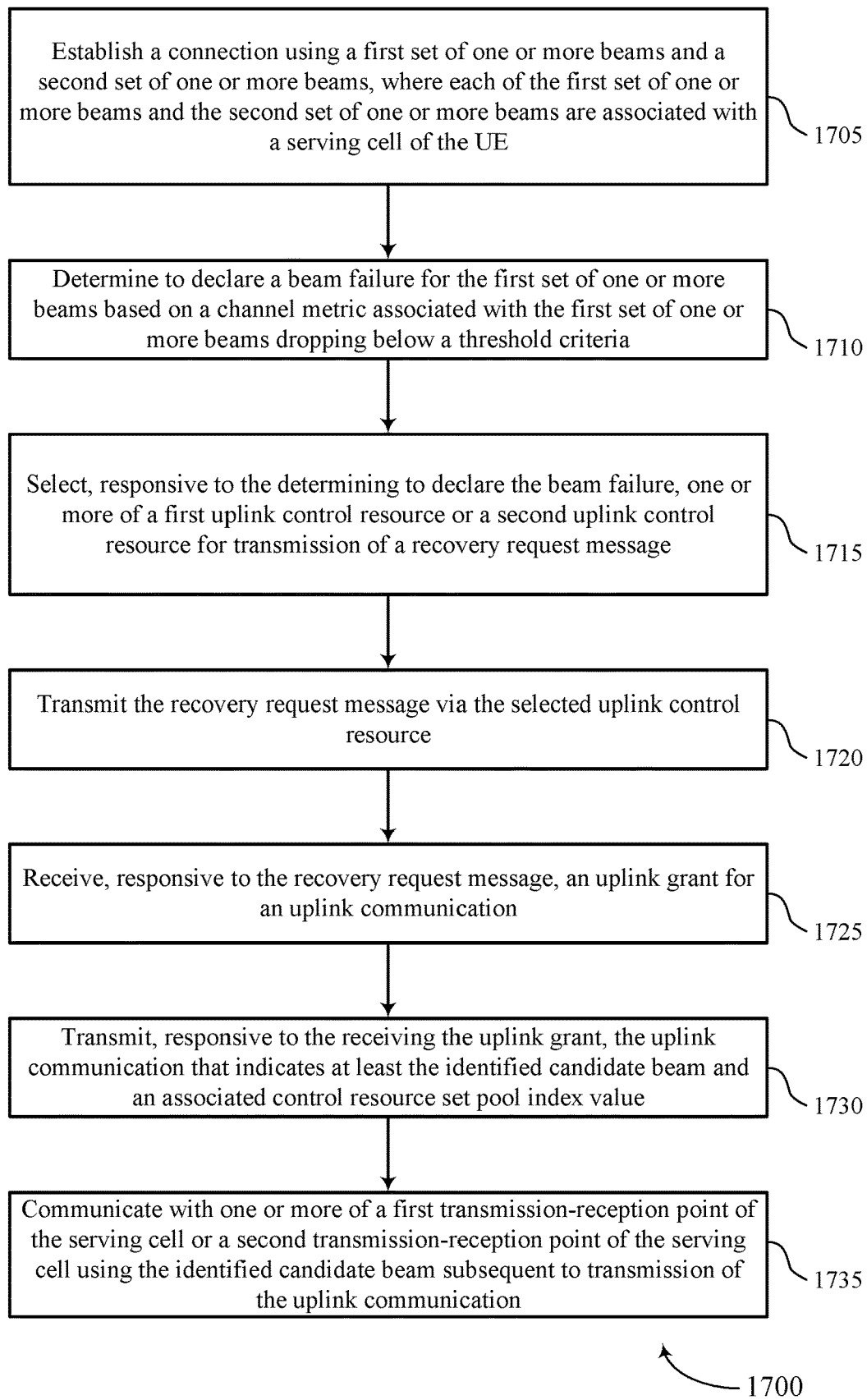

FIG. 17 shows a flowchart illustrating a method 1700 that supports beam failure recovery techniques for multiple transmission-reception points in a secondary cell in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may establish a connection using a first set of one or more beams and a second set of one or more beams, where each of the first set of one or more beams and the second set of one or more beams are associated with a serving cell of the UE. The operations of 1705 may be performed according to the methods described herein. In some examples, aspects of the operations of 1705 may be performed by a connection manager as described with reference to FIGS. 6 through 9.

At 1710, the UE may determine to declare a beam failure for the first set of one or more beams based on a channel metric associated with the first set of one or more beams dropping below a threshold criteria. The operations of 1710 may be performed according to the methods described herein. In some examples, aspects of the operations of 1710 may be performed by a beam failure detection manager as described with reference to FIGS. 6 through 9.

At 1715, the UE may select, responsive to the determining to declare the beam failure, one or more of a first uplink control resource or a second uplink control resource for transmission of a recovery request message. The operations of 1715 may be performed according to the methods described herein. In some examples, aspects of the operations of 1715 may be performed by a resource selection manager as described with reference to FIGS. 6 through 9.

At 1720, the UE may transmit the recovery request message via the selected uplink control resource. The operations of 1720 may be performed according to the methods described herein. In some examples, aspects of the operations of 1720 may be performed by a beam recovery manager as described with reference to FIGS. 6 through 9.

At 1725, the UE may receive, responsive to the recovery request message, an uplink grant for an uplink communication. The operations of 1725 may be performed according to the methods described herein. In some examples, aspects of the operations of 1725 may be performed by a beam recovery manager as described with reference to FIGS. 6 through 9.

At 1730, the UE may transmit, responsive to the receiving the uplink grant, the uplink communication that indicates at least the identified candidate beam and an associated control resource set pool index value of the serving cell. The operations of 1730 may be performed according to the methods described herein. In some examples, aspects of the operations of 1730 may be performed by a beam recovery manager as described with reference to FIGS. 6 through 9.

At 1735, the UE may communicate with one or more of a first transmission-reception point of the serving cell or a second transmission-reception point of the serving cell using the identified candidate beam subsequent to transmission of the uplink communication. The operations of 1735 may be performed according to the methods described herein. In some examples, aspects of the operations of 1735 may be performed by a connection manager as described with reference to FIGS. 6 through 9.

Figure 18:
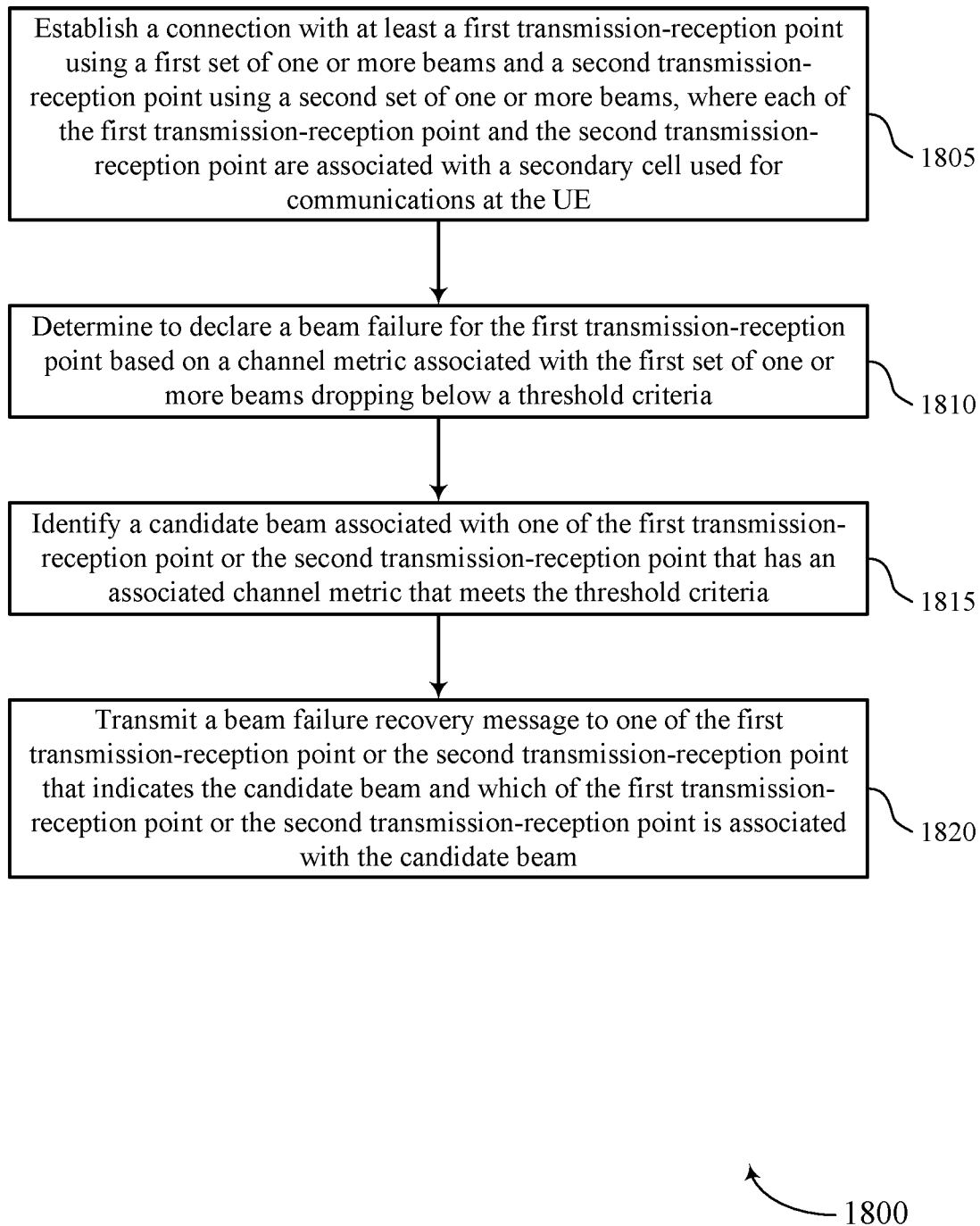

FIG. 18 shows a flowchart illustrating a method 1800 that supports beam failure recovery techniques for multiple transmission-reception points in a secondary cell in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may establish a connection with at least a first transmission-reception point using a first set of one or more beams and a second transmission-reception point using a second set of one or more beams, where each of the first transmission-reception point and the second transmission-reception point are associated with a secondary cell used for communications at the UE. The operations of 1805 may be performed according to the methods described herein. In some examples, aspects of the operations of 1805 may be performed by a connection manager as described with reference to FIGS. 6 through 9.

At 1810, the UE may determine to declare a beam failure for the first transmission-reception point based on a channel metric associated with the first set of one or more beams dropping below a threshold criteria. The operations of 1810 may be performed according to the methods described herein. In some examples, aspects of the operations of 1810 may be performed by a beam failure detection manager as described with reference to FIGS. 6 through 9.

At 1815, the UE may identify a candidate beam associated with one of the first transmission-reception point or the second transmission-reception point that has an associated channel metric that meets the threshold criteria. The operations of 1815 may be performed according to the methods described herein. In some examples, aspects of the operations of 1815 may be performed by a candidate beam detection manager as described with reference to FIGS. 6 through 9.

At 1820, the UE may transmit a beam failure recovery message to one of the first transmission-reception point or the second transmission-reception point that indicates the candidate beam and which of the first transmission-reception point or the second transmission-reception point is associated with the candidate beam. The operations of 1820 may be performed according to the methods described herein. In some examples, aspects of the operations of 1820 may be performed by a beam recovery manager as described with reference to FIGS. 6 through 9.

Figure 19:
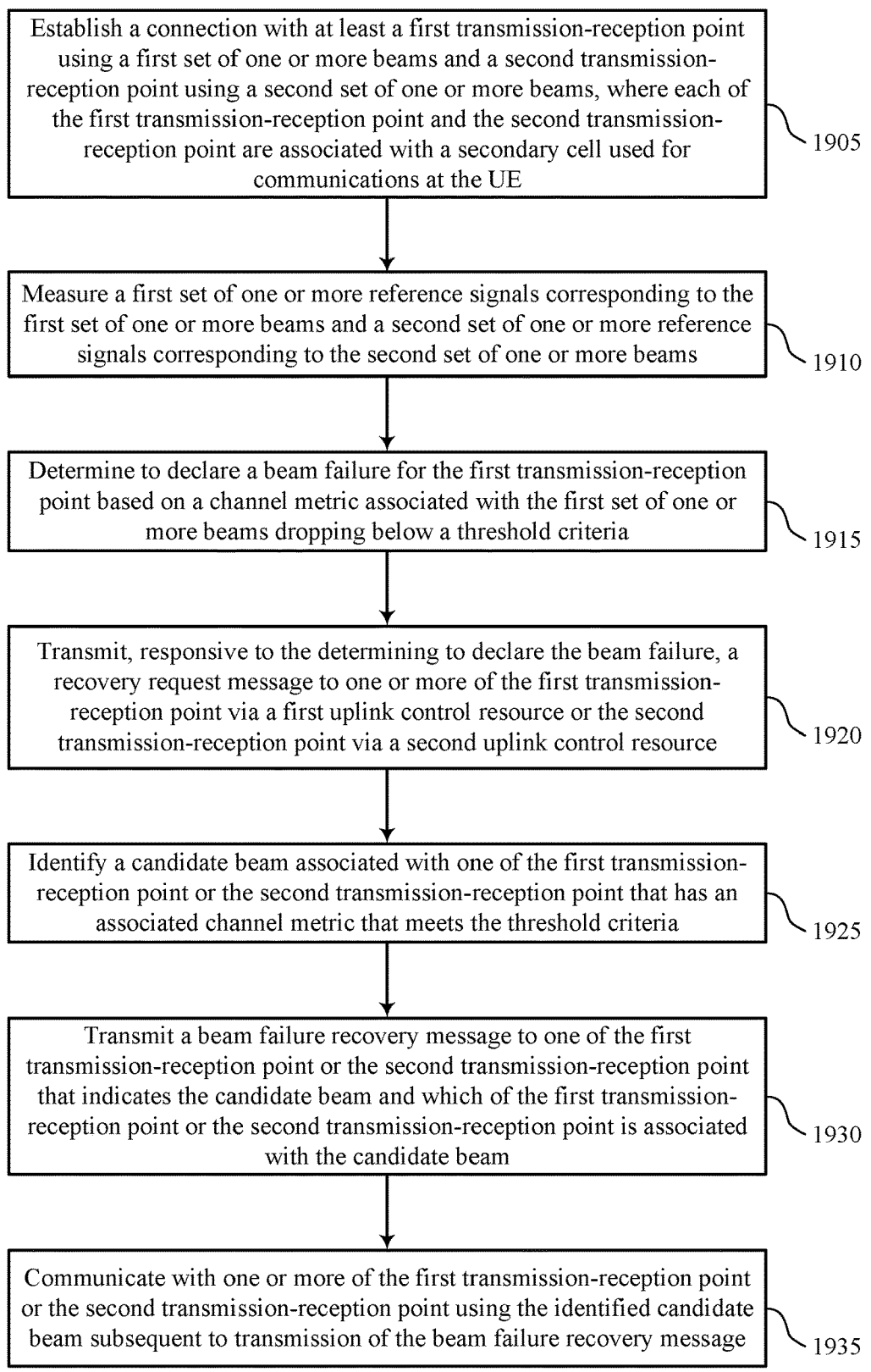

FIG. 19 shows a flowchart illustrating a method 1900 that supports beam failure recovery techniques for multiple transmission-reception points in a secondary cell in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may establish a connection with at least a first transmission-reception point using a first set of one or more beams and a second transmission-reception point using a second set of one or more beams, where each of the first transmission-reception point and the second transmission-reception point are associated with a secondary cell used for communications at the UE. The operations of 1905 may be performed according to the methods described herein. In some examples, aspects of the operations of 1905 may be performed by a connection manager as described with reference to FIGS. 6 through 9.

At 1910, the UE may measure a first set of one or more reference signals corresponding to the first set of one or more beams and a second set of one or more reference signals corresponding to the second set of one or more beams. The operations of 1910 may be performed according to the methods described herein. In some examples, aspects of the operations of 1910 may be performed by a beam failure detection manager as described with reference to FIGS. 6 through 9. In some cases, the first set of one or more reference signals and the first set of one or more beams are associated with a first control resource set pool index value, and the second set of one or more reference signals and the second set of one or more beams are associated with a second control resource set pool index value.

At 1915, the UE may determine to declare a beam failure for the first transmission-reception point based on a channel metric associated with the first set of one or more beams dropping below a threshold criteria. The operations of 1915 may be performed according to the methods described herein. In some examples, aspects of the operations of 1915 may be performed by a beam failure detection manager as described with reference to FIGS. 6 through 9.

At 1920, the UE may transmit, responsive to the determining to declare the beam failure, a recovery request message to one or more of the first transmission-reception point via a first uplink control resource or the second transmission-reception point via a second uplink control resource. The operations of 1920 may be performed according to the methods described herein. In some examples, aspects of the operations of 1920 may be performed by a beam recovery manager as described with reference to FIGS. 6 through 9.

At 1925, the UE may identify a candidate beam associated with one of the first transmission-reception point or the second transmission-reception point that has an associated channel metric that meets the threshold criteria. The operations of 1925 may be performed according to the methods described herein. In some examples, aspects of the operations of 1925 may be performed by a candidate beam detection manager as described with reference to FIGS. 6 through 9.

At 1930, the UE may transmit a beam failure recovery message to one of the first transmission-reception point or the second transmission-reception point that indicates the candidate beam and which of the first transmission-reception point or the second transmission-reception point is associated with the candidate beam. The operations of 1930 may be performed according to the methods described herein. In some examples, aspects of the operations of 1930 may be performed by a beam recovery manager as described with reference to FIGS. 6 through 9.

At 1935, the UE may communicate with one or more of the first transmission-reception point or the second transmission-reception point using the identified candidate beam subsequent to transmission of the beam failure recovery message. The operations of 1935 may be performed according to the methods described herein. In some examples, aspects of the operations of 1935 may be performed by a connection manager as described with reference to FIGS. 6 through 9. In some cases, communications using the identified candidate beam are initiated by resetting the beams for one or more control resource sets with a same value as a control resource set pool index value of the identified candidate beam.

Figure 20:
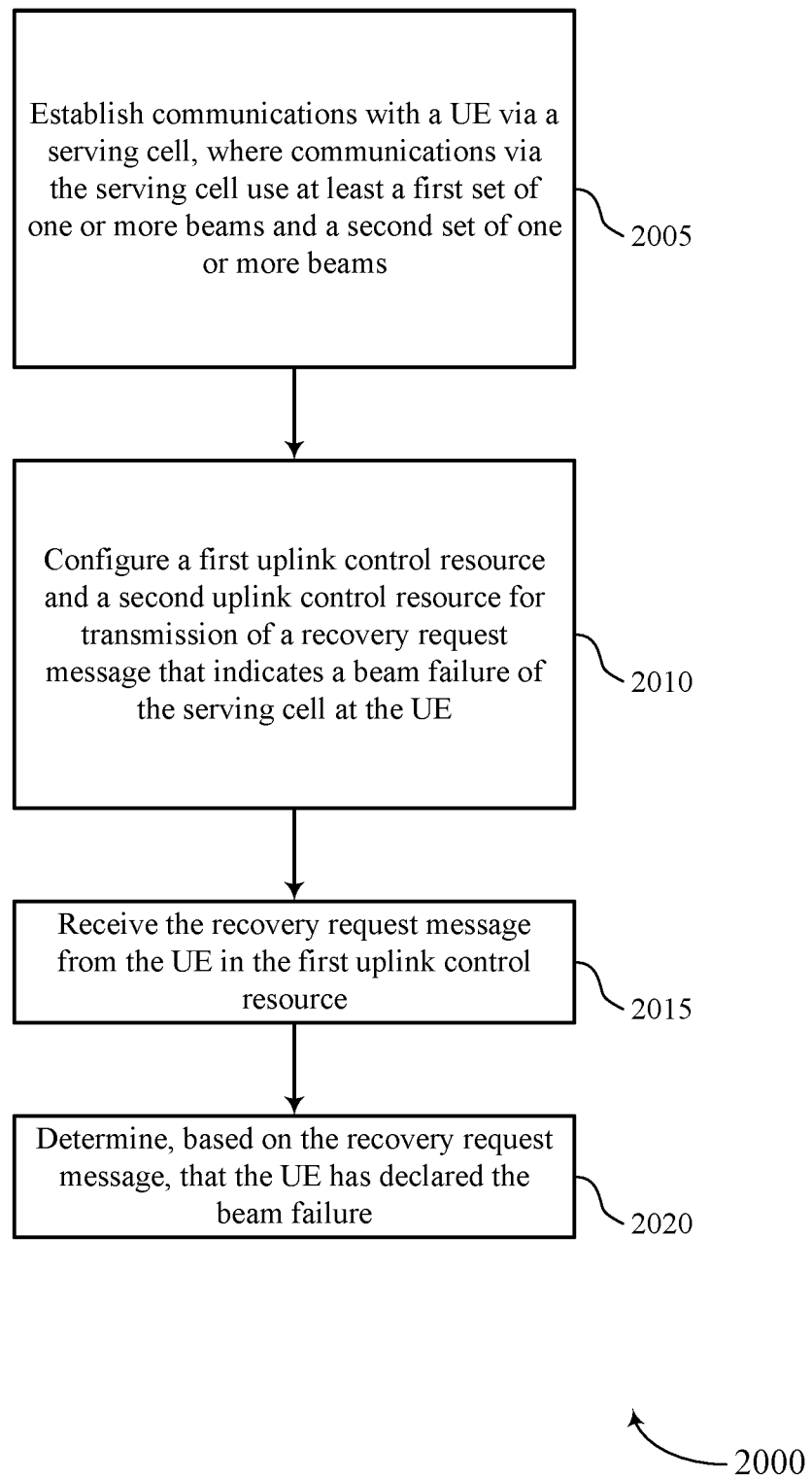

FIG. 20 shows a flowchart illustrating a method 2000 that supports beam failure recovery techniques for multiple transmission-reception points in a secondary cell in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may establish communications with a UE via a serving cell, where communications via the serving cell use at least a first set of one or more beams of the serving cell and a second set of one or more beams of the serving cell. The operations of 2005 may be performed according to the methods described herein. In some examples, aspects of the operations of 2005 may be performed by a connection manager as described with reference to FIGS. 10 through 13.

At 2010, the base station may configure a first uplink control resource and a second uplink resource for transmission of a recovery request message that indicates a beam failure of the serving cell at the UE. The operations of 2010 may be performed according to the methods described herein. In some examples, aspects of the operations of 2010 may be performed by a configuration manager as described with reference to FIGS. 10 through 13.

At 2015, the base station may receive the recovery request message from the UE in the first uplink control resource. The operations of 2015 may be performed according to the methods described herein. In some examples, aspects of the operations of 2015 may be performed by a recovery message manager as described with reference to FIGS. 10 through 13.

At 2020, the base station may determine, based on the recovery request message, that the UE has declared the beam failure. The operations of 2020 may be performed according to the methods described herein. In some examples, aspects of the operations of 2020 may be performed by a beam failure detection manager as described with reference to FIGS. 10 through 13.

Figure 21:
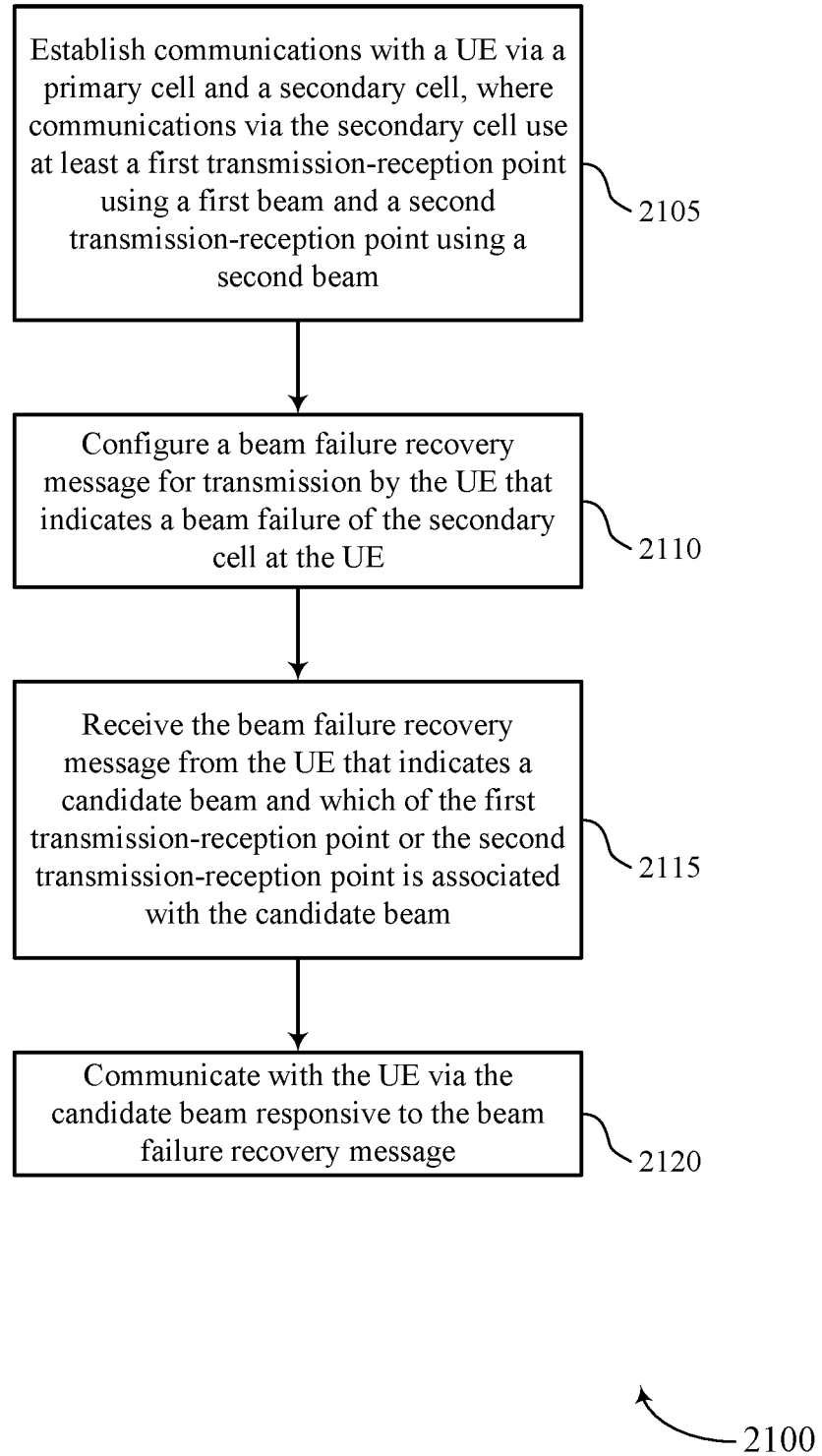

FIG. 21 shows a flowchart illustrating a method 2100 that supports beam failure recovery techniques for multiple transmission-reception points in a secondary cell in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may establish communications with a UE via a primary cell and a secondary cell, where communications via the secondary cell use at least a first transmission-reception point using a first beam and a second transmission-reception point using a second beam. The operations of 2105 may be performed according to the methods described herein. In some examples, aspects of the operations of 2105 may be performed by a connection manager as described with reference to FIGS. 10 through 13.

At 2110, the base station may configure a beam failure recovery message for transmission by the UE that indicates a beam failure of the secondary cell at the UE. The operations of 2110 may be performed according to the methods described herein. In some examples, aspects of the operations of 2110 may be performed by a recovery message manager as described with reference to FIGS. 10 through 13.

At 2115, the base station may receive the beam failure recovery message from the UE that indicates a candidate beam and which of the first transmission-reception point or the second transmission-reception point is associated with the candidate beam. The operations of 2115 may be performed according to the methods described herein. In some examples, aspects of the operations of 2115 may be performed by a candidate beam detection manager as described with reference to FIGS. 10 through 13.

At 2120, the base station may communicate with the UE via the candidate beam responsive to the beam failure recovery message. The operations of 2120 may be performed according to the methods described herein. In some examples, aspects of the operations of 2120 may be performed by a connection manager as described with reference to FIGS. 10 through 13.

Figure 22:
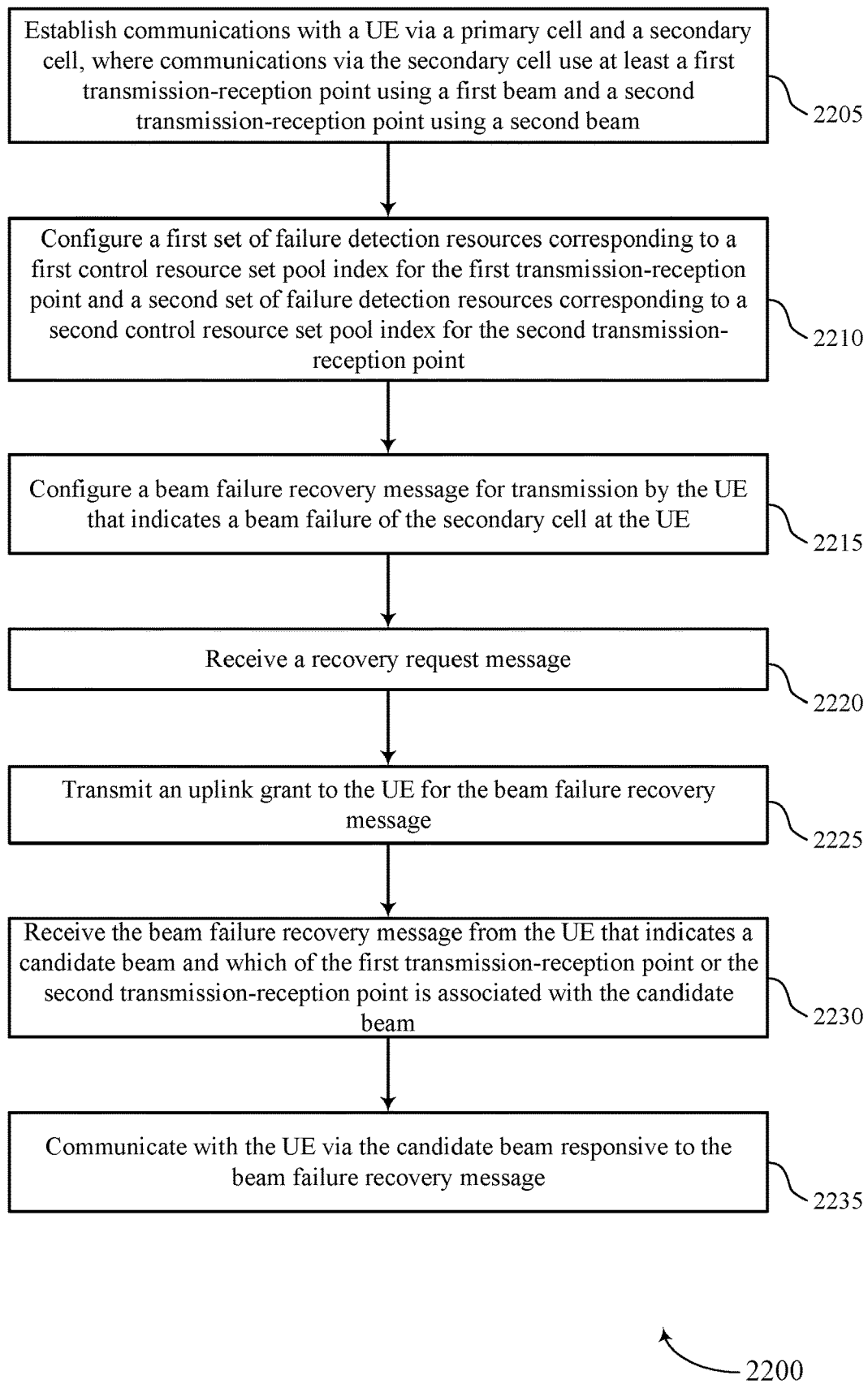

FIG. 22 shows a flowchart illustrating a method 2200 that supports beam failure recovery techniques for multiple transmission-reception points in a secondary cell in accordance with aspects of the present disclosure. The operations of method 2200 may be implemented by a base station 105 or its components as described herein. For example, the operations of method 2200 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2205, the base station may establish communications with a UE via a primary cell and a secondary cell, where communications via the secondary cell use at least a first transmission-reception point using a first beam and a second transmission-reception point using a second beam. The operations of 2205 may be performed according to the methods described herein. In some examples, aspects of the operations of 2205 may be performed by a connection manager as described with reference to FIGS. 10 through 13.

At 2210, the base station may configure a first set of failure detection resources corresponding to a first control resource set pool index for the first transmission-reception point and a second set of failure detection resources corresponding to a second control resource set pool index for the second transmission-reception point, and where the beam failure recovery message is communicated using the set of failure detection resources that corresponds to one of the first transmission-reception point or the second transmission-reception point. The operations of 2210 may be performed according to the methods described herein. In some examples, aspects of the operations of 2210 may be performed by a configuration manager as described with reference to FIGS. 10 through 13.

At 2215, the base station may configure a beam failure recovery message for transmission by the UE that indicates a beam failure of the secondary cell at the UE. The operations of 2215 may be performed according to the methods described herein. In some examples, aspects of the operations of 2215 may be performed by a recovery message manager as described with reference to FIGS. 10 through 13.

At 2220, the base station may receive a recovery request message. The operations of 2220 may be performed according to the methods described herein. In some examples, aspects of the operations of 2220 may be performed by a beam recovery manager as described with reference to FIGS. 10 through 13.

At 2225, the base station may transmit an uplink grant to the UE for the beam failure recovery message. The operations of 2225 may be performed according to the methods described herein. In some examples, aspects of the operations of 2225 may be performed by a beam recovery manager as described with reference to FIGS. 10 through 13.

At 2230, the base station may receive the beam failure recovery message from the UE that indicates a candidate beam and which of the first transmission-reception point or the second transmission-reception point is associated with the candidate beam. The operations of 2230 may be performed according to the methods described herein. In some examples, aspects of the operations of 2230 may be performed by a candidate beam detection manager as described with reference to FIGS. 10 through 13.

At 2235, the base station may communicate with the UE via the candidate beam responsive to the beam failure recovery message. The operations of 2235 may be performed according to the methods described herein. In some examples, aspects of the operations of 2235 may be performed by a connection manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising one or more memories storing processor-executable code, and one or more processors coupled with the one or more memories, wherein the one or more processors are configured to, when executing the code, cause the UE to:
   establish a connection with a serving cell of the UE;
   receive reference signals via a first set of failure detection resources, a second set of failure detection resources, a first set of candidate beam resources associated with the first set of failure detection resources, and a second set of candidate beam resources associated with the second set of failure detection resources;
   detecting a beam failure based at least in part on a radio link quality associated with the first set of failure detection resources or the second set of failure detection resources;
   transmit a recovery request message via at least one uplink control resource configured by a scheduling request identifier associated with multiple transmission-reception point beam failure recovery based at least in part on detection of the beam failure; and
   transmit, in accordance with the recovery request message, a failure recovery message indicating the serving cell on which the beam failure is detected, whether the beam failure is detected for one or both of a first transmission-reception point of the serving cell or a second transmission-reception point of the serving cell, a candidate beam associated with the first set of candidate beam resources or the second set of candidate beam resources, and whether the candidate beam corresponds to the first transmission-reception point or the second transmission-reception point, wherein the failure recovery message comprises a medium access control-control element that includes a plurality of fields that each indicate beam failure detection information for a respective cell, wherein the plurality of fields are ordered with respect to a serving cell index of the respective cell,
   wherein the one or more processors are further configured to cause the UE to:
      measure a first set of one or more reference signals corresponding to a first set of one or more beams and a second set of one or more reference signals corresponding to a second set of one or more beams, wherein the first set of one or more reference signals and the first set of one or more beams are associated with a first control resource set pool index value, and wherein the second set of one or more reference signals and the second set of one or more beams are associated with a second control resource set pool index value, and wherein a declaration of a beam failure is based at least in part on a first power measurement associated with the first set of one or more reference signals dropping below a threshold;
      identify the candidate beam based on an associated channel metric of the candidate beam that meets the threshold or one or more other criteria; and
      determine a control resource set pool index value of the candidate beam, wherein selection of the at least one uplink control resource is based at least in part on the control resource set pool index value of the candidate beam.

2. The apparatus of claim 1, wherein the one or more processors are further configured to cause the UE to:
   transmit an indication that declares the beam failure for the first set of one or more beams of the serving cell, wherein to identify the candidate beam, the one or more processors are configured to cause the UE to identify the candidate beam from within a set of candidate beams associated with the first control resource set pool index value for which the beam failure is declared.

3. The apparatus of claim 1, wherein the first control resource set pool index value is associated with the first transmission-reception point of the serving cell and the second control resource set pool index value is associated with the second transmission-reception point of the serving cell.

4. An apparatus for wireless communication at a user equipment (UE), comprising one or more memories storing processor-executable code, and one or more processors coupled with the one or more memories, wherein the one or more processors are configured to, when executing the code, cause the UE to:
   establish a connection with a serving cell of the UE;
   receive reference signals via a first set of failure detection resources, a second set of failure detection resources, a first set of candidate beam resources associated with the first set of failure detection resources, and a second set of candidate beam resources associated with the second set of failure detection resources;
   detecting a beam failure based at least in part on a radio link quality associated with the first set of failure detection resources or the second set of failure detection resources;
   transmit a recovery request message via at least one uplink control resource configured by a scheduling request identifier associated with multiple transmission-reception point beam failure recovery based at least in part on detection of the beam failure; and
   transmit, in accordance with the recovery request message, a failure recovery message indicating the serving cell on which the beam failure is detected, whether the beam failure is detected for one or both of a first transmission-reception point of the serving cell or a second transmission-reception point of the serving cell, a candidate beam associated with the first set of candidate beam resources or the second set of candidate beam resources, and whether the candidate beam corresponds to the first transmission-reception point or the second transmission-reception point, wherein the failure recovery message comprises a medium access control-control element that includes a plurality of fields that each indicate beam failure detection information for a respective cell, wherein the plurality of fields are ordered with respect to a serving cell index of the respective cell, wherein the one or more processors are further configured to cause the UE to:

receive configuration information that indicates a first set of one or more reference signals associated with a first control resource set pool index value and a second set of one or more reference signals associated with a second control resource set pool index value;

measure the first set of one or more reference signals and the second set of one or more reference signals;

identify the candidate beam based at least in part on measurements of the first set of one or more reference signals and the second set of one or more reference signals; and determine which of the first control resource set pool index value or the second control resource set pool index value is associated with the candidate beam based at least in part on the configuration information.

5. An apparatus for wireless communication at a user equipment (UE), comprising one or more memories storing processor-executable code, and one or more processors coupled with the one or more memories, wherein the one or more processors are configured to, when executing the code, cause the UE to:

establish a connection with a serving cell of the UE;

receive reference signals via a first set of failure detection resources, a second set of failure detection resources, a first set of candidate beam resources associated with the first set of failure detection resources, and a second set of candidate beam resources associated with the second set of failure detection resources;

detecting a beam failure based at least in part on a radio link quality associated with the first set of failure detection resources or the second set of failure detection resources;

transmit a recovery request message via at least one uplink control resource configured by a scheduling request identifier associated with multiple transmission-reception point beam failure recovery based at least in part on detection of the beam failure; and transmit, in accordance with the recovery request message, a failure recovery message indicating the serving cell on which the beam failure is detected, whether the beam failure is detected for one or both of a first transmission-reception point of the serving cell or a second transmission-reception point of the serving cell, a candidate beam associated with the first set of candidate beam resources or the second set of candidate beam resources, and whether the candidate beam corresponds to the first transmission-reception point or the second transmission-reception point, wherein the failure recovery message comprises a medium access control-control element that includes a plurality of fields that each indicate beam failure detection information for a respective cell, wherein the plurality of fields are ordered with respect to a serving cell index of the respective cell, wherein the one or more processors are further configured to cause the UE to: select a first uplink control resource or a second uplink control resource for transmission of the recovery request message based at least in part on which of the first uplink control resource or the second uplink control resource is associated with a lowest control resource set pool index value.

6. The apparatus of claim 5, wherein to select the first uplink control resource or the second uplink control resource, the one or more processors are configured to cause the UE to select the first uplink control resource or the second uplink control resource using the lowest control resource set pool index value when the serving cell and a component carrier used for transmission of the recovery request message are associated with different frequency bands.

7. A method for wireless communication at a user equipment (UE), comprising:

establishing a connection with a serving cell of the UE;

receiving reference signals via a first set of failure detection resources, a second set of failure detection resources, a first set of candidate beam resources associated with the first set of failure detection resources, and a second set of candidate beam resources associated with the second set of failure detection resources;

detecting a beam failure based at least in part on a radio link quality associated with the first set of failure detection resources or the second set of failure detection resources;

transmitting a recovery request message via at least one uplink control resource configured by a scheduling request identifier associated with multiple transmission-reception point beam failure recovery based at least in part on detection of the beam failure; and transmitting, in accordance with the recovery request message, a failure recovery message indicating the serving cell on which the beam failure is detected, whether the beam failure is detected for one or both of a first transmission-reception point of the serving cell or a second transmission-reception point of the serving cell, a candidate beam associated with the first set of candidate beam resources or the second set of candidate beam resources, and whether the candidate beam corresponds to the first transmission-reception point or the second transmission-reception point, wherein the failure recovery message comprises a medium access control-control element that includes a plurality of fields that each indicate beam failure detection information for a respective cell, wherein the plurality of fields are ordered with respect to a serving cell index of the respective cell, wherein the method further comprises:

(a) measuring a first set of one or more reference signals corresponding to a first set of one or more beams and a second set of one or more reference signals corresponding to a second set of one or more beams, wherein the first set of one or more reference signals and the first set of one or more beams are associated with a first control resource set pool index value, and wherein the second set of one or more reference signals and the second set of one or more beams are associated with a second control resource set pool index value, and wherein a declaration of a beam failure is based at least in part on a first power measurement associated with the first set of one or more reference signals dropping below a threshold; identifying the candidate beam based on an associated channel metric of the candidate beam that meets the threshold or one or more other criteria; and determining a control resource set pool index value of the candidate beam, wherein the at least one uplink control resource is selected based at least in part on the control resource set pool index value of the candidate beam; or
(b) receiving configuration information that indicates the first set of one or more reference signals associated with the first control resource set pool index value and the second set of one or more reference signals associated with the second control resource set pool index value; measuring the first set of one or more reference signals and the second set of one or more reference signals; identifying the candidate beam based at least in part on measurements of the first set of one or more reference signals and the second set of one or more reference signals; and determining which of the first control resource set pool index value or the second control resource set pool index value is associated with the candidate beam based at least in part on the configuration information; or
(c) selecting a first uplink control resource or a second uplink control resource for transmission of the recovery request message based at least in part on which of the first uplink control resource or the second uplink control resource is associated with a lowest control resource set pool index value.

8. The method of claim 7, wherein the method comprises:
measuring the first set of one or more reference signals corresponding to the first set of one or more beams and the second set of one or more reference signals corresponding to the second set of one or more beams, wherein the first set of one or more reference signals and the first set of one or more beams are associated with the first control resource set pool index value, and wherein the second set of one or more reference signals and the second set of one or more beams are associated with the second control resource set pool index value, and wherein the declaration of the beam failure is based at least in part on the first power measurement associated with the first set of one or more reference signals dropping below the threshold;
identifying the candidate beam based on the associated channel metric of the candidate beam that meets the threshold or the one or more other criteria; and
determining the control resource set pool index value of the candidate beam, wherein the at least one uplink control resource is selected based at least in part on the control resource set pool index value of the candidate beam.

9. The method of claim 8, wherein the first control resource set pool index value is associated with the first transmission-reception point of the serving cell and the second control resource set pool index value is associated with the second transmission-reception point of the serving cell.

10. The method of claim 8, wherein the method comprises transmitting an indication that declares the beam failure for the first set of one or more beams of the serving cell, wherein the candidate beam is identified from within a set of candidate beams associated with the first control resource set pool index value for which the beam failure is declared.

11. The method of claim 7, wherein the method comprises:
receiving configuration information that indicates the first set of one or more reference signals associated with the first control resource set pool index value and the second set of one or more reference signals associated with the second control resource set pool index value;
measuring the first set of one or more reference signals and the second set of one or more reference signals;
identifying the candidate beam based at least in part on measurements of the first set of one or more reference signals and the second set of one or more reference signals; and
determining which of the first control resource set pool index value or the second control resource set pool index value is associated with the candidate beam based at least in part on the configuration information.

12. The method of claim 7, wherein the method comprises selecting the first uplink control resource or the second uplink control resource for transmission of the recovery request message based at least in part on which of the first uplink control resource or the second uplink control resource is associated with the lowest control resource set pool index value.

13. The method of claim 12, wherein the lowest control resource set pool index value is used for selection of the first uplink control resource or the second uplink control resource when the serving cell and a component carrier used for transmission of the recovery request message are associated with different frequency bands.

* * * * *